(12) United States Patent
Kildishev et al.

(10) Patent No.: US 11,656,386 B2
(45) Date of Patent: May 23, 2023

(54) TUNABLE PLASMONIC COLOR DEVICE AND METHOD OF MAKING THE SAME

(71) Applicant: Purdue Research Foundation, West Lafayette, IN (US)

(72) Inventors: Alexander V. Kildishev, West Lafayette, IN (US); Di Wang, West Lafayette, IN (US); Zhaxylyk A. Kudyshev, West Lafayette, IN (US); Maowen Song, West Lafayette, IN (US); Alexandra Boltasseva, West Lafayette, IN (US); Vladimir M. Shalaev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 87 days.

(21) Appl. No.: 17/224,338

(22) Filed: Apr. 7, 2021

(65) Prior Publication Data

US 2021/0325577 A1    Oct. 21, 2021

Related U.S. Application Data

(63) Continuation-in-part of application No. 16/932,834, filed on Jul. 20, 2020, now Pat. No. 11,193,829, and a continuation of application No. 16/411,038, filed on May 13, 2019, now abandoned, said application No. 16/932,834 is a continuation of application No. 16/233,036, filed on Dec. 26, 2018, now Pat. No. 10,760,970, which is a continuation of application
(Continued)

(51) Int. Cl.
*G02B 5/00*     (2006.01)
*G11B 7/125*    (2012.01)
*G11B 7/1381*   (2012.01)

(52) U.S. Cl.
CPC ............. *G02B 5/008* (2013.01); *G11B 7/125* (2013.01); *G11B 7/1381* (2013.01)

(58) Field of Classification Search
CPC ..... G02B 5/008; G02B 5/3025; G02B 5/3058
USPC ........................................ 359/485.05, 490.01
See application file for complete search history.

(56) References Cited

U.S. PATENT DOCUMENTS 9,671,327 B2 *  6/2017  Pinchuk .............. G01N 21/554
10,776,679 B2 * 9/2020  Bouchon ............. B42D 25/324
(Continued)

*Primary Examiner* — Ricky D Shafer
(74) *Attorney, Agent, or Firm* — Piroozi-IP, LLC

(57) ABSTRACT

A plasmonic system is disclosed. The system includes at least one polarizer that is configured to provide at least one linearly polarized broadband light beam, an anisotropic plasmonic metasurface (APM) assembly having a plurality of nanoantennae each having a predetermined orientation with respect to a global axis representing encoded digital data, the APM assembly configured to receive the at least one linearly polarized broadband light beam and by applying localized surface plasmon resonance reflect light with selectable wavelengths associated with the predetermined orientations of the nanoantennae, and at least one analyzer that is configured to receive the reflected light with selectable wavelength, wherein the relative angles between each of the at least one analyzers and each of the at least one polarizers are selectable with respect to the global axis, thereby allowing decoding of the digital data.

20 Claims, 31 Drawing Sheets
(29 of 31 Drawing Sheet(s) Filed in Color)

Related U.S. Application Data

No. 15/202,048, filed on Jul. 5, 2016, now Pat. No. 10,161,797.

(60) Provisional application No. 62/672,585, filed on May 17, 2018, provisional application No. 62/188,727, filed on Jul. 5, 2015.

(56) References Cited

U.S. PATENT DOCUMENTS

| | | | |
|---|---|---|---|
| 2009/0310133 A1* | 12/2009 | Ogino | G02B 5/204 |
| | | | 356/310 |
| 2014/0085693 A1* | 3/2014 | Mosallaei | G02B 1/002 |
| | | | 359/107 |
| 2016/0341859 A1* | 11/2016 | Shvets | G02B 27/286 |
| 2017/0003169 A1* | 1/2017 | Shaltout | G02B 1/002 |
| 2017/0146707 A1* | 5/2017 | Kawabata | G02B 5/201 |
| 2018/0107015 A1* | 4/2018 | Dumpelmann | G02B 5/008 |
| 2018/0156949 A1* | 6/2018 | Tsai | G03H 1/0244 |
| 2020/0201111 A1* | 6/2020 | Williams | G02B 5/1876 |

\* cited by examiner

| Decoded Frame | | | |
|---|---|---|---|
| 001 | 100 | 101 | 111 |
| 010 | 000 | 110 | 100 |
| 001 | 011 | 101 | 111 |
| 000 | 010 | 100 | 110 |

TUNABLE PLASMONIC COLOR DEVICE AND METHOD OF MAKING THE SAME

CROSS-REFERENCE TO RELATED APPLICATIONS

The present patent application is related to and claims the priority benefit of U.S. Non-Provisional patent application Ser. No. 16/411,038 filed May 13, 2019 which claimed the priority benefit of Provisional Patent Application Ser. No. 62/672,585 filed May 17, 2018; and is further related as a continuation-in-part application and claims the priority benefit of U.S. Non-Provisional patent application Ser. No. 16/932,834 filed Jul. 20, 2020, which claimed the priority benefit of U.S. Non-Provisional patent application Ser. No. 16/233,036 filed on Dec. 26, 2018, now U.S. Pat. No. 10,760,970 to Shaltout et al., and which claimed the priority benefit of U.S. Non-Provisional patent application Ser. No. 15/202,048 filed Jul. 5, 2016, now U.S. Pat. No. 10,161,797 to Shaltout et al., and which claimed the priority benefit of U.S. Provisional Patent Application Ser. No. 62/188,727 filed Jul. 5, 2015 the contents of each of which are hereby incorporated by reference in its entirety into the present disclosure.

STATEMENT REGARDING GOVERNMENT FUNDING

This invention was made with government support under FA9550-14-1-0389 awarded by US Air Force Office of Scientific Research and HR0011-17-2-0032 awarded by Defense Advanced Research Projects Agency. The government has certain rights in the invention.

TECHNICAL FIELD

The present disclosure is related to storage of digital data, and in particular to optical storage of digital utilizing colors generated by localized surface plasmon resonance.

BACKGROUND

This section introduces aspects that may help facilitate a better understanding of the disclosure. Accordingly, these statements are to be read in this light and are not to be understood as admissions about what is or is not prior art.

Humans today have an insatiable appetite for generating data. The increase in data production is overwhelming. For example, rapid development of the Internet-of-Things (IoT), widespread social networking, and multimedia content delivery with the increasing dominance of high-data content files, e.g., holding high-resolution movies, produces an astounding amount of data with estimates of 33 zettabytes (ZB, 1 ZB=$10^{21}$ bytes) in 2018 and with an exponential growth to 175 ZB by 2025. As such, there is a rising need for affordable, long-term storage of big data with a high-speed readout and this need is becoming a social and technical challenge.

Optical storage has been already offering solutions as media capable of storing large volumes of data with longevity to cover at least several human generations. Required characteristics of digital media include write-once to make the media tamper-proof and to avoid erasure by mistake, maintenance free with lifespan of 100 years and more, and stable without costly environmental requirements. The evolution of optical storage includes compact discs holding 650 MB-800 MB, digital video disk holding 4.7 GB-9 GB, and Blue-ray disks holding 35 GB-100 GB. Thus far, the optical storage industry has been employing direct engineering strategies: (i) recording on both the land and the valley regions of the optical disk groove, (ii) increasing the number of layers per disc, and (iii) arranging the multilayer discs in parallel arrays. This straightforward multi-layer, multi-disk engineering strategy does not deliver a significant cost-per-bit advantage—each layer on such a disk is still fabricated individually. Moreover, the current commercialized data storage technology is nearing the theoretical limit for storage density, as a basic storage unit accommodates only one bit of information and its size is already close to the diffraction limit of the readout laser.

The Morse Code has been around since the 1830s, but those same general 'dots-n-dashes' are still used in conventional and most advanced industrial optical storage media systems available today. Advanced manufacturing techniques have assisted with increasing storage density for optical storage technologies. Yet, one big issue remains. As the storage density increases, the industry would have to downscale by decreasing the pitch distance between the grooves, the wavelength, and by increasing the numerical aperture of the readout lens. Then, once the diffraction limit and space constraints are reached, the only way out is to parallelize the storage process. In this case, information is recorded on multiple layers and both sides of a disc, as well as on multiple discs. Unfortunately, with this approach the cost per GB remains the same or becomes even higher. Also, as the density increases the multiple disk approach does not help with downsizing the entire storage system.

When reading the information from the optical disc, there is typically a single sensor at each side of the disk reading the dots and dashes. Thus, by retrieving only a single bit of information per reading, the sequential readout of information significantly limits the overall metrics of the system, because of the low throughput and larger system with higher energy consumption for simultaneous readout of multiple disks.

Therefore, there is an unmet need for a novel approach to improve data storage density and efficiency of data retrieval from the same.

SUMMARY

A plasmonic system is disclosed. The system includes at least one polarizer that is configured to provide at least one linearly polarized broadband light beam. The system also includes an anisotropic plasmonic metasurface (APM) assembly having a plurality of nanoantennae having predetermined orientations with respect to a global axis representing encoded digital information. The APM assembly is configured to receive the at least one linearly polarized broadband light beam. The APM assembly by applying localized surface plasmon resonance is further configured to reflect light beam with selectable wavelengths associated with the predetermined orientations of the nanoantennae. The system also includes at least one analyzer that is configured to receive the reflected light with selectable wavelengths. The relative angles between each of the at least one analyzer and each of the at least one polarizer with respect to a global axis are selectable with respect to the orientation of the nanoantennae to thereby allow decoding of the encoded information.

A method of storing digital data in a plasmonic system is disclosed. The method includes linearly polarizing at least one broadband light beam by at least one polarizer. The method also includes applying the at least one linearly polarized light beam to an anisotropic plasmonic metasurface (APM) assembly having a plurality of nanoantennae each having a predetermined orientation with respect to a global axis representing encoded digital data. The APM assembly is configured to receiving the at least one linearly polarized broadband light beam and applying localized surface plasmon resonance. The APM assembly is also configured to reflecting light with selectable wavelengths associated with the predetermined orientations of the nanoantennae. The method also includes adjusting relative angles between the at least one analyzer and each of the at least one polarizer with respect to the global axis. The method further includes analyzing the reflected light with selectable wavelength by each of the at least one analyzer. The method also includes decoding the digital data from the analyzed reflected light.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 3b are comparisons between the simulated colors (left) and CCD camera photographed colors (right) under the four polarizer-analyzer combinations of FIG. 3a.

FIG. 5e is a table of stored binary data in FIG. 5a which are retrieved after comparing the color sequence on each nanopixel and the color codes in FIG. 5b.

Figure 5A:
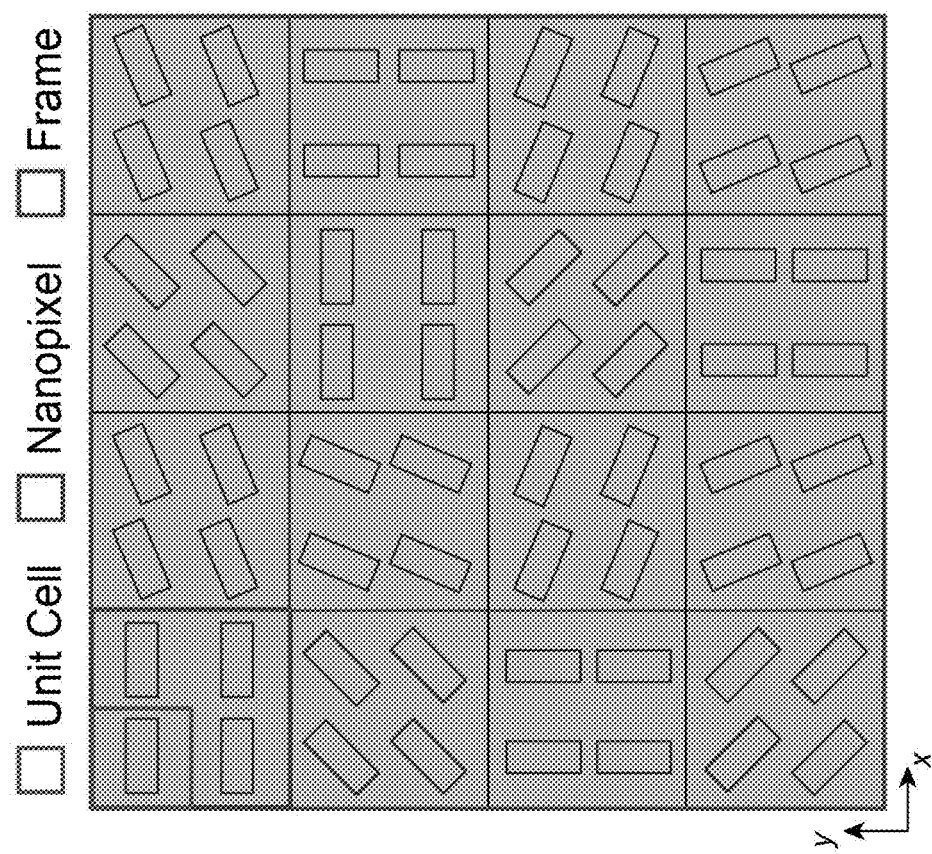
FIG. 5a is schematic representation of a frame of a data-storage of the anisotropic plasmonic metasurface assembly of FIG. 1b containing 16 nanopixels (the blue box highlights one nanopixel), each including 4 unit cells (the green box highlights one unit cell), where a nanopixel serves as an indivisible data storage unit, which accommodates 3 bits or more of information.
Figure 5B:
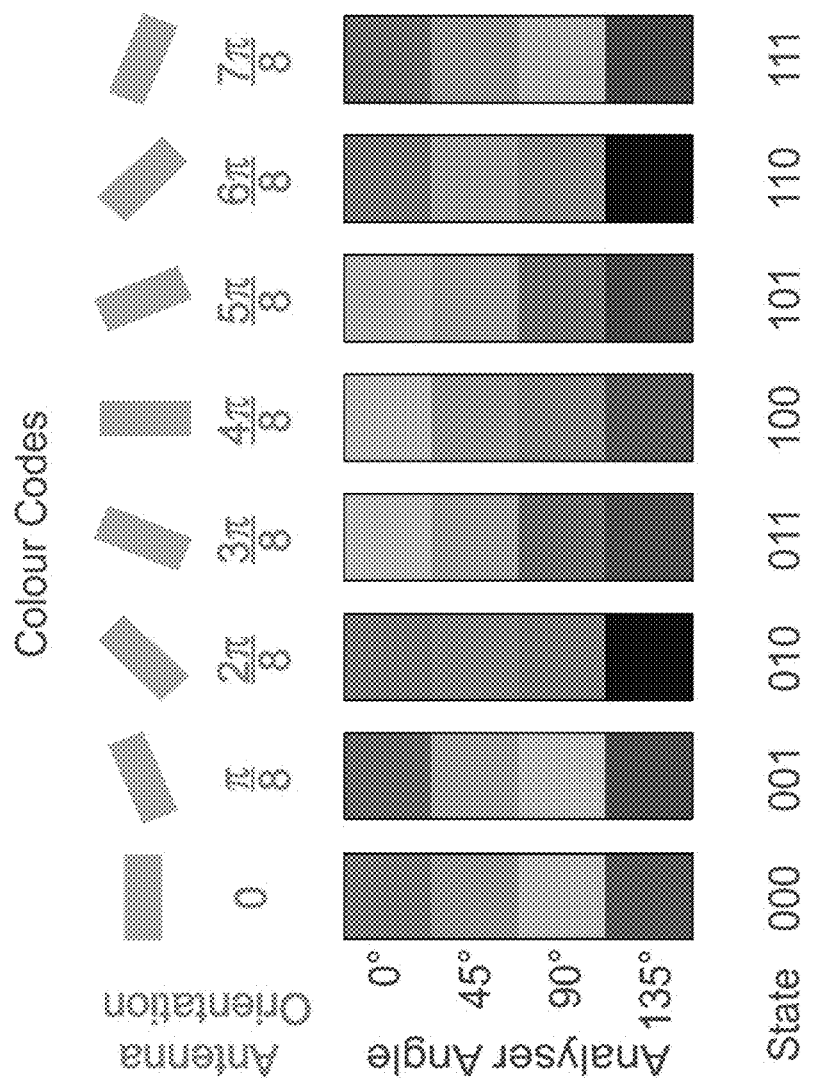
FIG. 5b is a unique color code created for each nanoantenna orientation, which is then assigned a 3-bit information state, so that a 3-bit information can be stored with identically oriented nanoantennae inside a nanopixel.
Figure 5C:
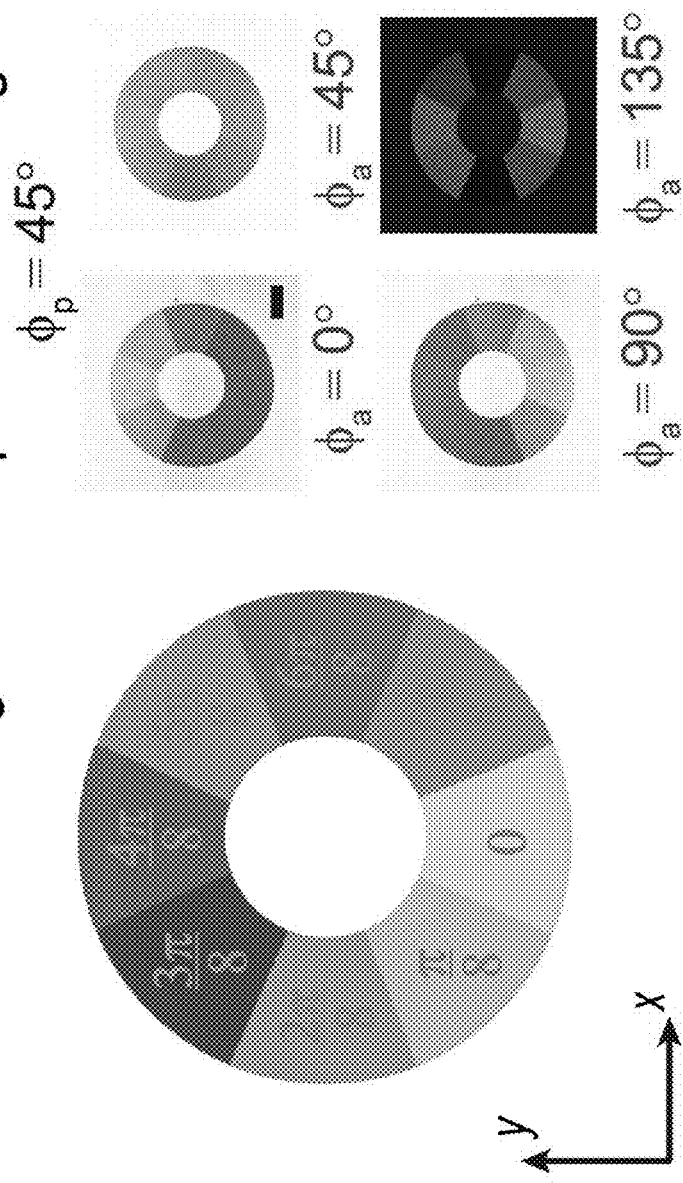
FIG. 5c is schematic of a designed pattern of a wheel including eight equal segments, each occupied by nanoantennae with the orientation marked by the numbers (left panel) and the photographed images under four analyzer angles with polarizer fixed at 45° with respect to the x-axis (see FIG. 5d) (right panel).
Figure 5D:
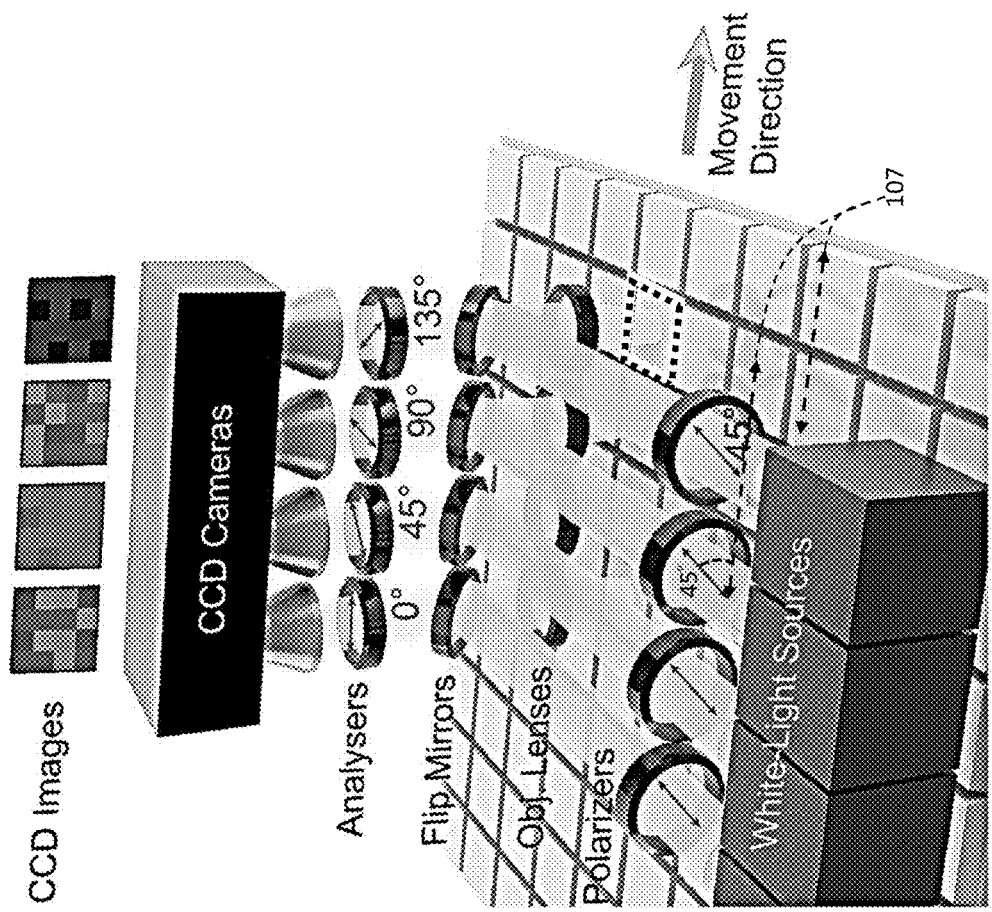
FIG. 5d is a schematic of an imaging system for speedy information readout from the anisotropic plasmonic metasurface assembly of FIG. 1b, which includes four white-light sources, four CCD cameras and a sample-moving stage.
Figure 5F:
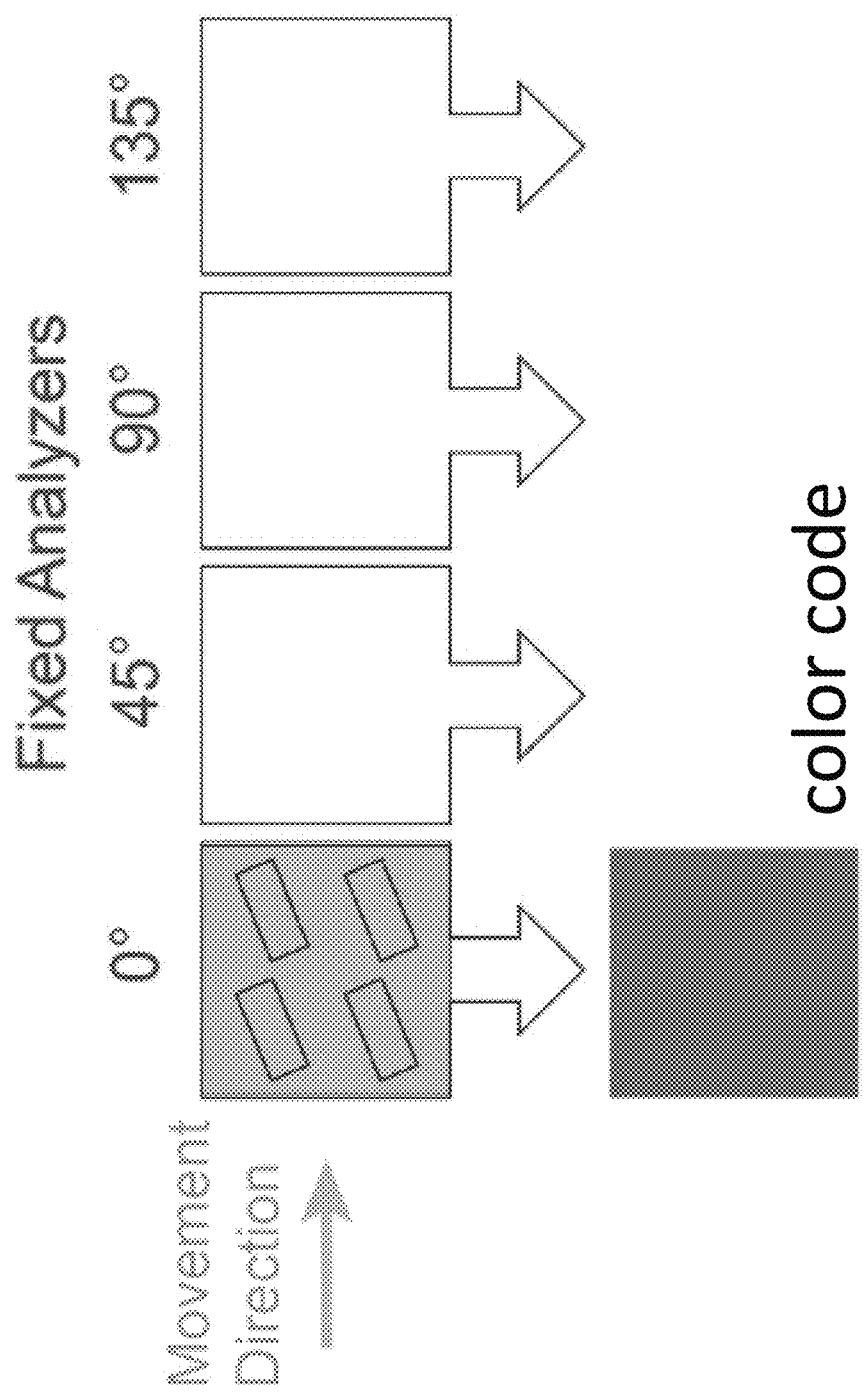
FIGS. 5f, 5g, 5h, and 5i are schematics showing nanopixel containing $$\frac{\pi}{8}$$
Figure 5G:
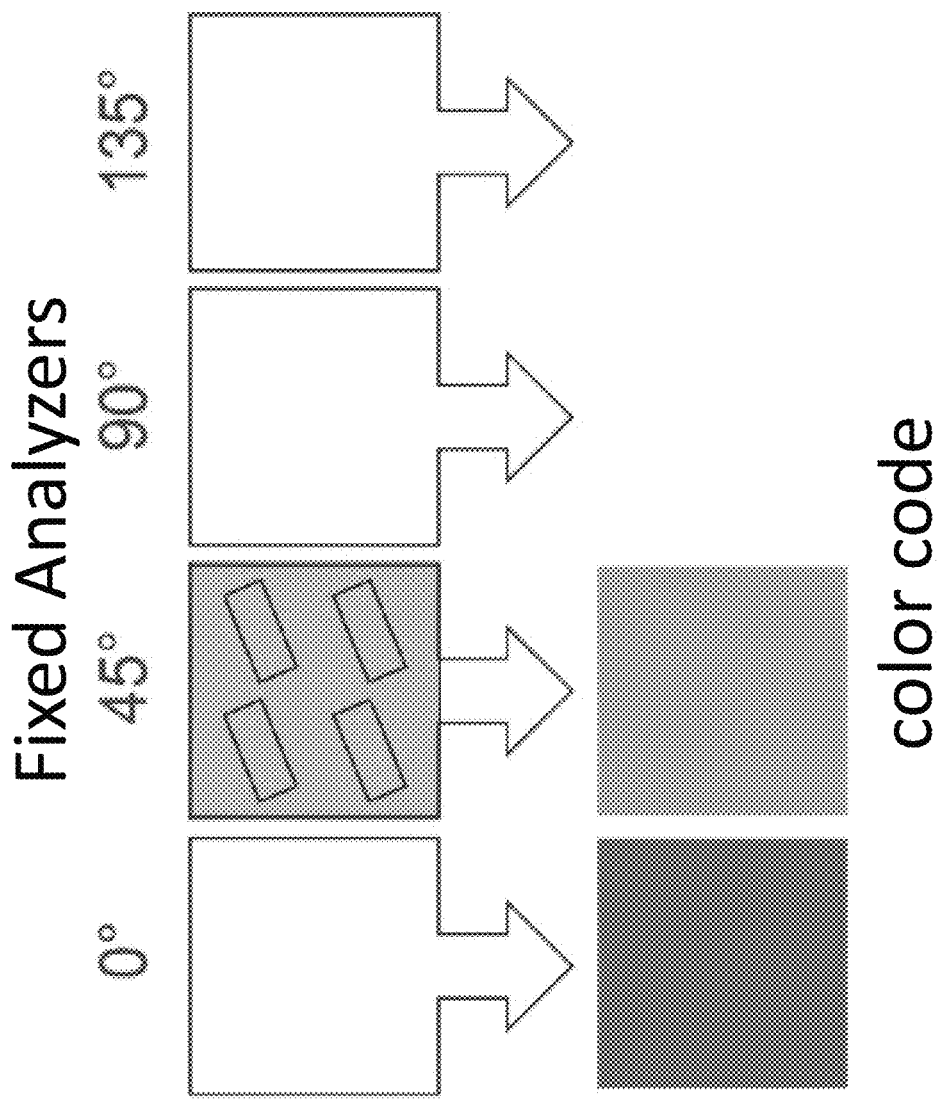
Figure 5H:
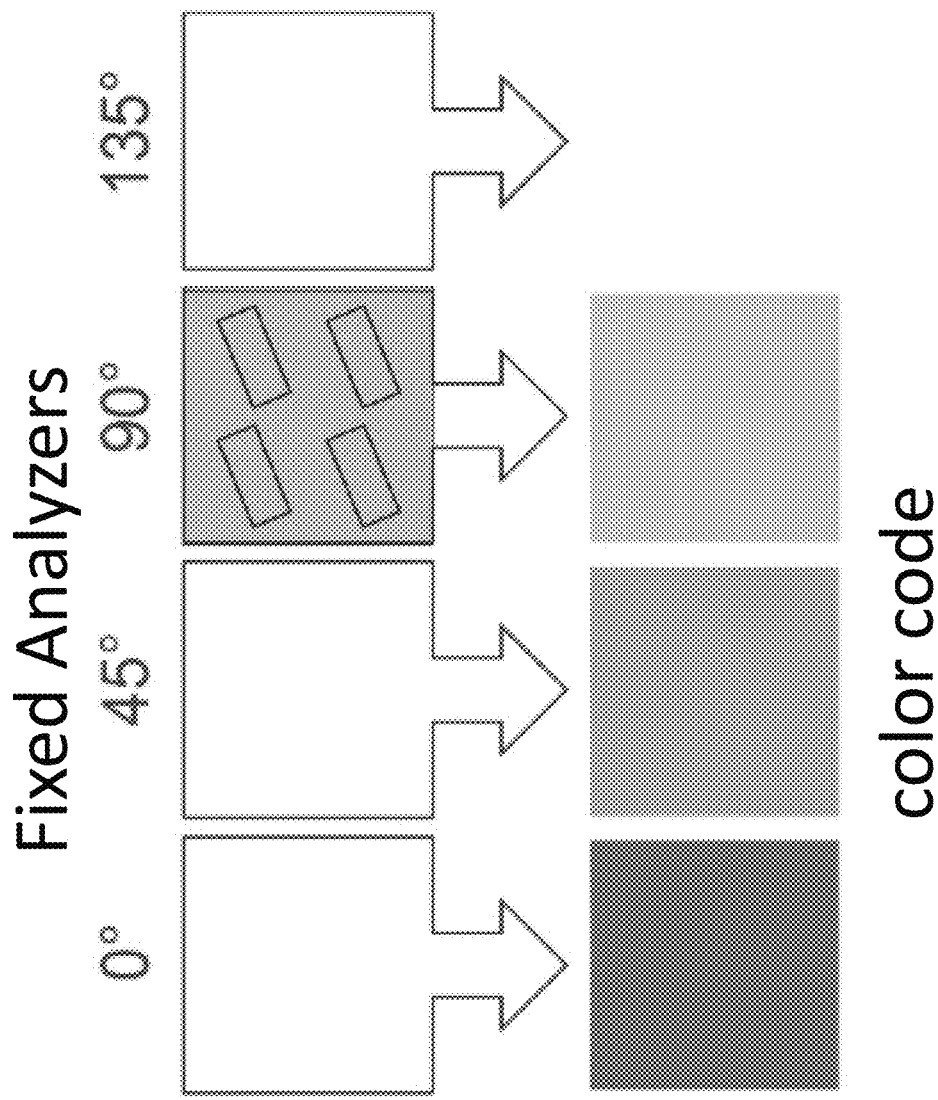
Figure 5I:
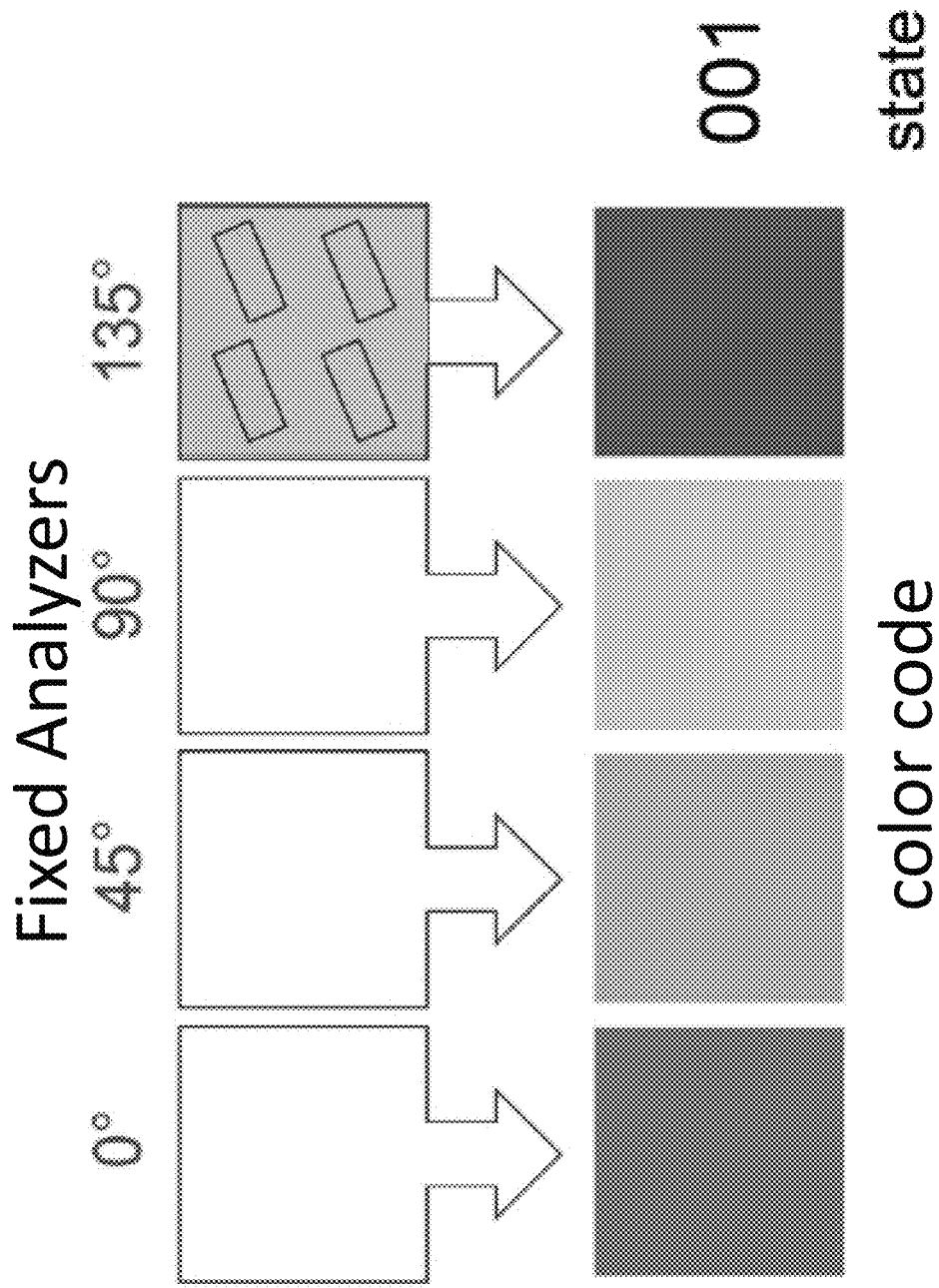

oriented nanoantennae imaged with the analyzer at 0°, 45°, 90° and 135° rotation states with respect to the x-axis (see FIG. 5d), respectively, and which renders maroon (FIG. 5f), orange (FIG. 5g), beige (FIG. 5h), and blue (FIG. 5i) colors, where the color sequence in FIG. 5i is matched with the look-up table of FIG. 5b to retrieve the binary code 001.

Figure 6:
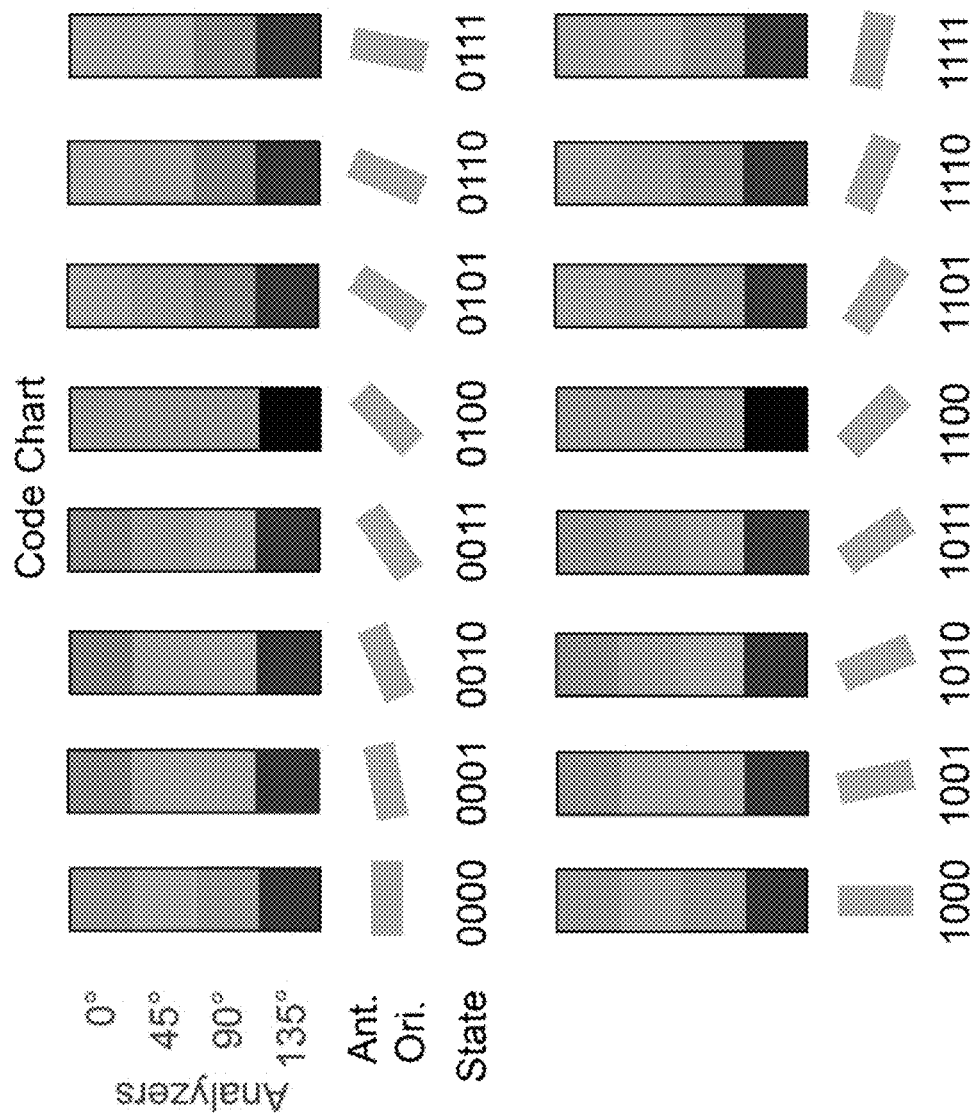

FIG. 6 is a schematic of simulated 4-color sequences encoding 4 bits of information (16 states) per nanopixel.

Figure 1A:
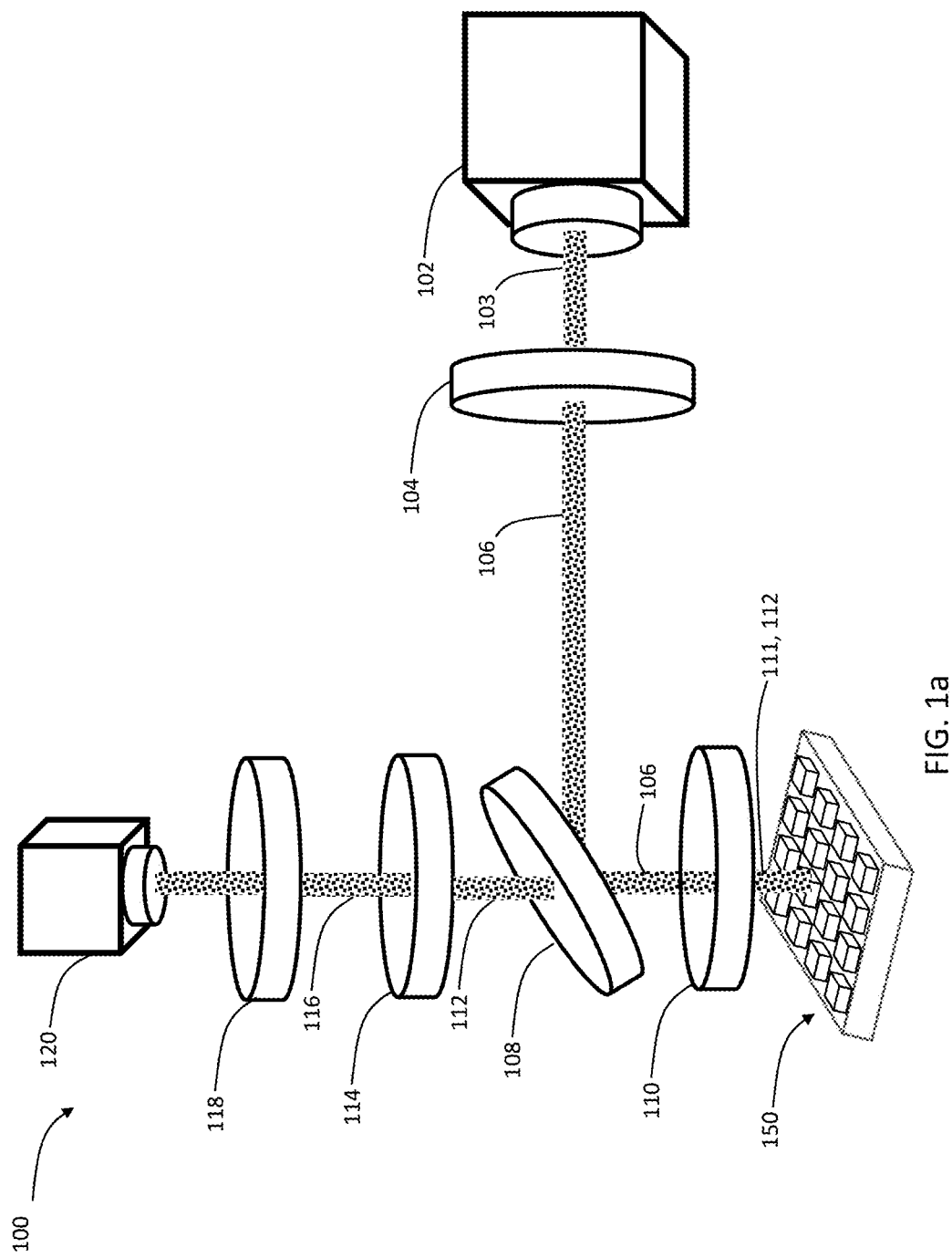
FIG. 1a is a schematic of a plasmonic system according to the present disclosure including a linear polarizer, an anisotropic plasmonic metasurface assembly, and an analyzer.
Figure 1B:
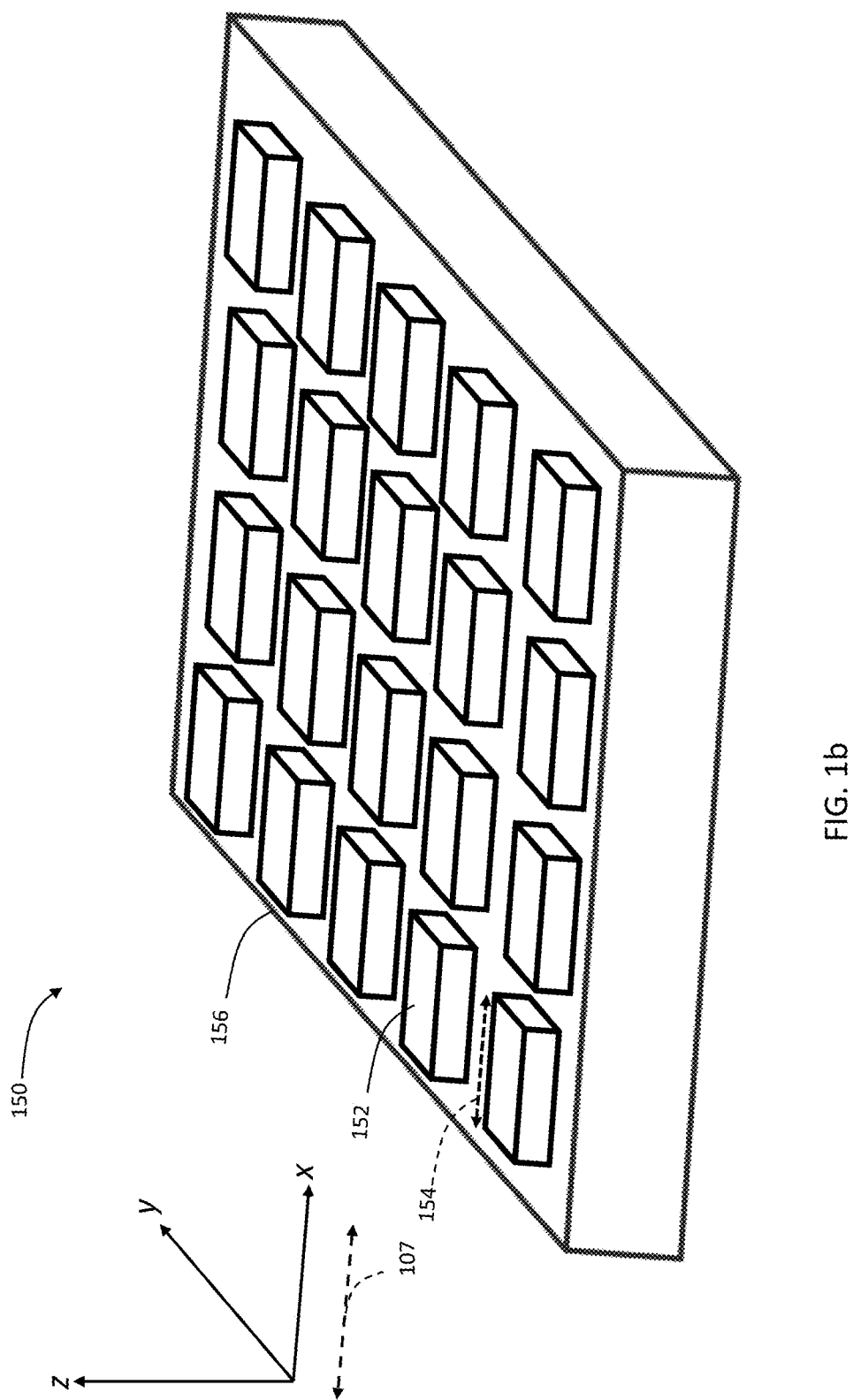
FIG. 1b is a schematic of the anisotropic plasmonic metasurface assembly of FIG. 1a, including a plurality of nanoantennae.
Figure 7A:
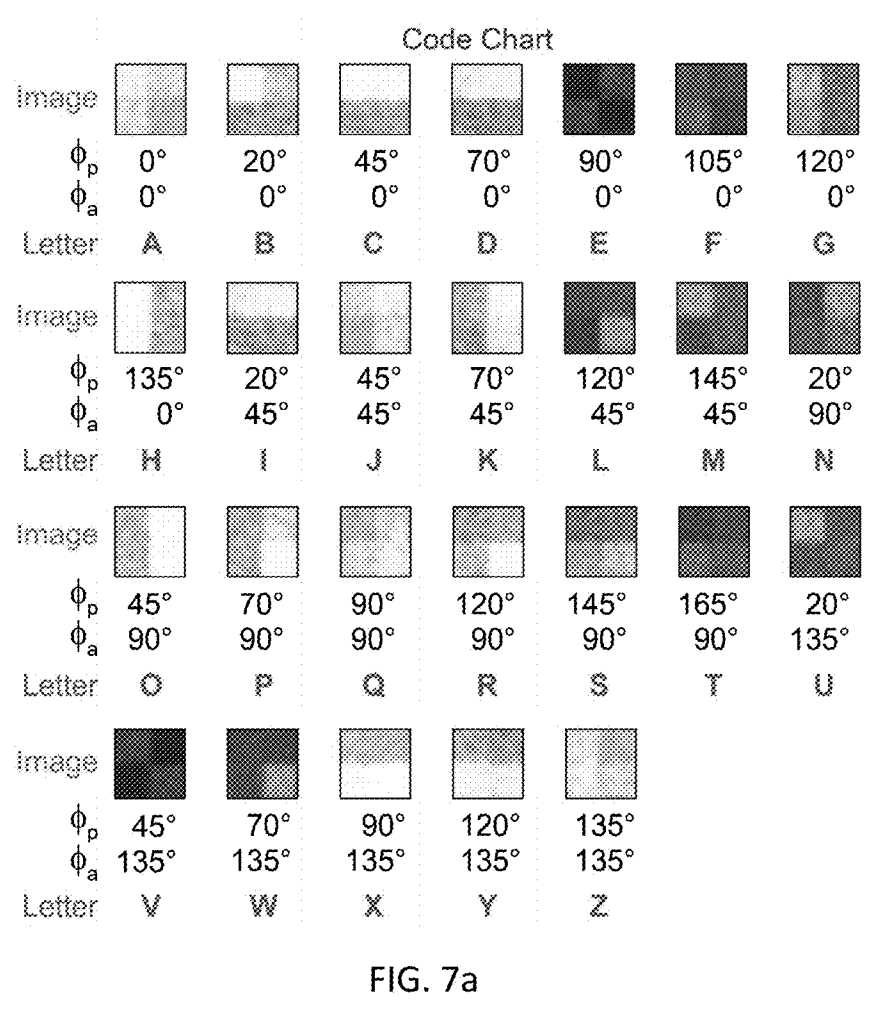

FIG. 7a is a schematic of a code chart of the color patterns when a ciphertext anisotropic plasmonic metasurface assembly of FIG. 1b is photographed with white light under 26 polarizer ($\phi_p$) and analyzer ($\phi_a$) combinations, each representing a letter in the English alphabet, where the polarizer and analyzer angles are used as decryption keys.

Figure 7B:
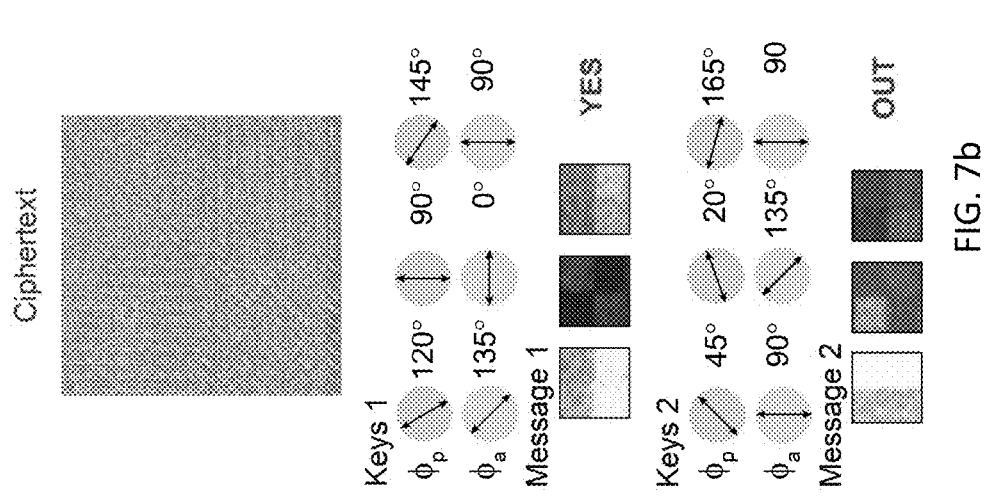

FIG. 7b are scanning electron microscope images of the ciphertext anisotropic plasmonic metasurface assembly of FIG. 1b, with different messages decrypted (YES and OUT) from the ciphertext by two sets of decryption keys.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach to improve data storage capacity and efficiency of data retrieval is provided herein. The novel approach includes the use of anisotropic plasmonic metasurface (APM) with formed nanoantenna elements that by localized surface plasmon resonance (LSPR) reflect back specific wavelengths of light (and thus specific colors). The colors can be decoded into bits of information and thus provide high-density storage capable media. With metasurface platforms based on plasmonic systems and methods described herein, three major functionalities in information technology—steganography, optical data storage, and encryption—can be realized. With the novel metasurfaces of the present disclosure, polarization-tunable colors in areas of 500×500 nm$^2$, presenting about 50,000 dpi resolution, can be achieved. The great color diversity leads to a judiciously designed optical steganography with vivid colors, with abated "cross-talk" effect, and swift tuning. The high spatial resolution is paired with a novel data storage and readout scheme that surpasses the state-of-the-art Blu-ray disk technology in both storage density and readout speed.

It should be appreciated that there are two basic ways to generate colors when starting with a broadband incident light. First is the use of dyes. When a dye is used, wavelengths associated with other colors of the incident light are absorbed, thus only reflecting the wavelength associated with the dye. In order to achieve richer colors, thickness of the material having the associated dye can be increased. Another approach for generating colors is through use of structures that cause resonant absorption of incident light. The latter is the method used for generating colors in the present disclosure. Metal particles due to their large resonant absorption cross-sections make a good choice for such structures. Hence, nanostructured metals can be used in order to minimize the dimensions of the diffracting structures. Thus, the present disclosure utilizes metals in nanoscale structures to achieve superior color diversity when appropriately used in the system of the present disclosure.

Additionally, the novel metasurfaces of the present disclosure are also used as a tool for information encryption, where multiple combinations of polarizer and analyzer angles are used as keys to decrypt text phrases. In the systems of the present disclosure, polarizer and analyzer contribute to the optical response. This feature not only presents the opportunity to erase, restore and tune the color image encoded in a common area but also improves the quality of imaging by abating the "cross-talk" effect which usually occurs in polarization-tunable color-producing structures, as known by a person having ordinary skill in the art. The metasurfaces of the present APMs can selectively generate different information without causing any deformation to the nanoantennae, therefore are more robust for read-only data storage applications.

Referring to FIG. 1a, a schematic of a plasmonic system 100 capable of utilizing APM and LSPR, according to the present disclosure is shown. The plasmonic system 100 includes a light source 102. The light source 102 can be any broadband light source, e.g., a halogen lamp. An example of the halogen lamb is NIKON HALOGEN 12V50W LV-LH50PC. A broadband light 103 exits from the light source 102 and passes through a linear polarizer 104 with which the broadband light 103 becomes a broadband linearly polarized light 106. The broadband linearly polarized light 106 is incident upon a flip mirror 108 which redirects the broadband linearly polarized light 106 downward towards a lens 110. The lens 110 focuses the incoming light towards the anisotropic plasmonic metasurface assembly 150. Light reflects from the anisotropic plasmonic metasurface assembly 150 as reflected light 112 which is passed through the lens 106 and through the flip mirror 108. The reflected light 112 then reaches an analyzer 114 (another broadband linear polarizer). The analyzer is capable of rotating from 0° to 180° from the position shown in FIG. 1a. The output of the analyzer 114 is a linearly polarized reflected light 116 which passes through a lens 118 and onto a chromatic camera 120, capable of analyzing colors of the linearly polarized reflected light 116. An example of the chromatic camera 120 is a NIKON ECLIPSE 80i microscope. A chromatic CCD Camera (QIMAGING MicroPublisher 5.0 RTV) is used to photograph the color images. The schematic of the plasmonic system 100 is provided as an exemplary schematic. It is not intended to be limiting. Other components can be used to provide the needed incident light onto the anisotropic plasmonic metasurface assembly 150 as well as other components to analyze the reflected light from the anisotropic plasmonic metasurface assembly 150. In all these other implementations, a polarized light is needed to be incident onto the anisotropic plasmonic metasurface assembly 150 and the reflected light from the anisotropic plasmonic metasurface assembly 150 needs to pass through a polarizer (analyzer) that is capable of rotating prior to being interrogated for its color content. The two broadband linear polarizers (analyzer 114 and linear polarizer 104), that cover the visible and ultraviolet region (200 nm-780 nm), and the chromatic camera 120 are integrated with a microscopic setup to image colors reflected from the APM under various analyzer 114 and linear polarizer 104 combinations.

The anisotropic plasmonic metasurface assembly 150 is capable of generating localized surface plasmon resonance. The anisotropic plasmonic metasurface assembly 150 includes periodic or semi-periodic arrangement of rectangular-shaped nanoantennae 152 disposed on an optically reflective substrate 156. Each rectangular-shaped nanoantennae 152 has a major axis 154, which when oriented in an unrotated fashion, as depicted in FIG. 1b, is parallel with an axis 107 (which is parallel to the x-axis). However, when the nanoantennae are rotated, as will be discussed later in the present disclosure in or der to encode digital data, the major axis will have an angular relationship with respect the axis 107. Also, as discussed above when the nanoantennae are placed to receive the broadband linearly polarized incident light 111 the angle of polarized light out of the linear polarizer is about 45° with respect to the axis 107 (see FIG. 5d). The material example for the nanoantennae 152 can be aluminum (Al) due to its broad-band plasmonic properties—it supports plasmon resonances in the wavelength range from the ultraviolet to the near-infrared, or other suitable metals that can generate the above-discussed localized surface plasmon resonance, as known to a person having ordinary skill in the art. Moreover, the lower cost of Al and its stability to corrosion makes it a good material suitable for the stated goal. The optically reflective substrate 156 can also be made of Al or other suitable optically reflective material. With respect to the material selection of the nanoantennae and the substrate, other metals, such as Mg, Rh, Ga, and In, and other semimetals can also be applied including transition metals and transition metal nitrides that could exhibit plasmonic response at the visible and near-UV parts of the spectrum such as MoN.

Figure 2A:
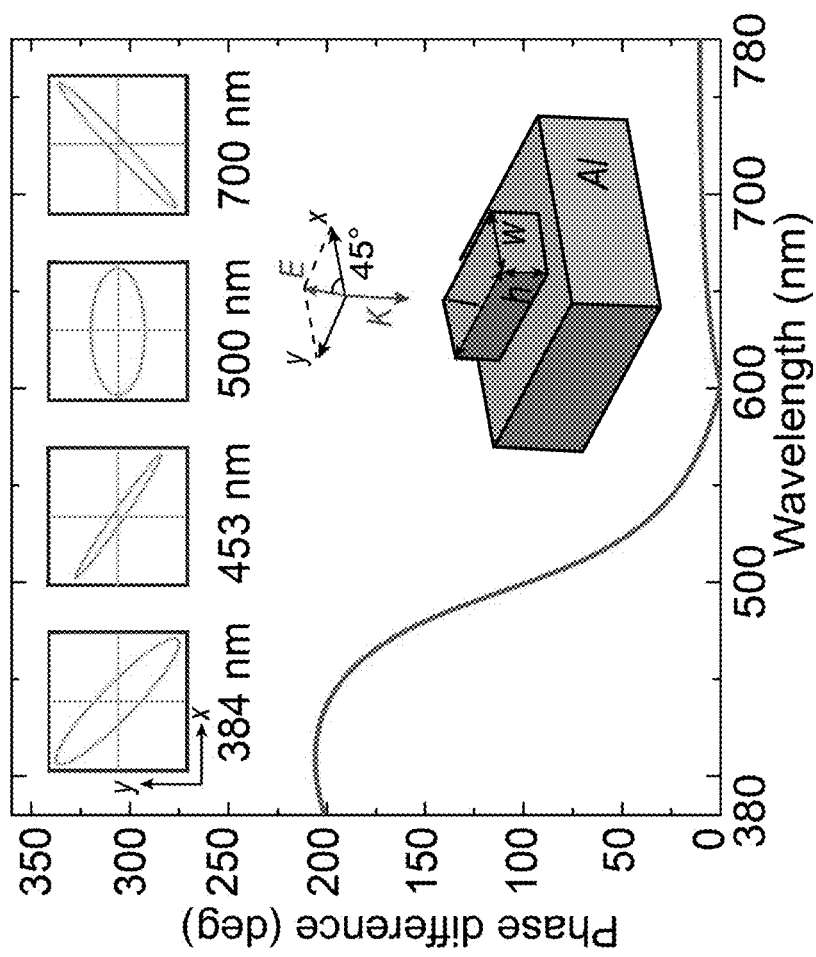
FIG. 2a is graph of calculated reflected light phase difference between x- and y-polarizations, as well as elliptical polarization states of the reflected wave at four select wavelengths based on one unit cell of the anisotropic plasmonic metasurface assembly of FIG. 1b, containing an individual Al nanoantenna with the incident polarization state.

While each of the nanoantenna shown in FIG. 1b is situated in a similar manner, the actual orientation of each nanoantenna can be adjusted as described below. Each nanoantenna 152 has dimensional characteristics shown in FIG. 2a as defined by h and w, where h is the height of the nanoantenna 152 and w is the width of the nanoantenna 152. As shown in the lower inset of FIG. 2a, the unit cell of the APM spans an area of about 250 nm×about 250 nm with an optimized length (l), width (w) and thickness (h) of the nanoantenna being, l is about 200 nm, w is about 80 nm, and h is about 70 nm. The single nanoantenna depicted in FIG. 2a is shown with the incident polarization state. The period (i.e., pitch) of individual nanoantenna in an array of the nanoantennae 152 is kept subwavelength to avoid diffraction, which causes unwanted sharp peaks in the reflectance spectra and deteriorates the color saturation. The curve in FIG. 2a indicates the phase difference δ between x- and y-polarizations that exhibits a pronounced 180° drop when the wavelength changes from about 460 nm to about 600 nm. The four insets in FIG. 2a show the calculated elliptical polarization states of the reflected E-field at four select wavelengths, clearly showing that the polarization state of the strongest reflected light is wavelength-dependent, an important feature of the optical-rotation effect.

When a diagonally oriented linear-polarized (LP) light beam is normally incident on the anisotropic plasmonic metasurface (APM), the electric field of the reflected light can be decomposed into the two eigenstates in x- and y-polarizations:

$$E_x = |E_x| \cos(kz - wt) \quad (1)$$

$$E_y = \Sigma_y | \cos(kz - wt + \delta) \quad (2)$$

where $|E_x|$ and $|E_y|$ are the amplitudes of the E-field along x and y directions, and $\delta = |\delta_x - \delta_y|$ is the phase difference between the reflected x- and y-polarizations. $E_x$, $E_y$, $\delta_x$ and $\delta_y$ for a given unit cell design can be obtained using a commercial full-wave solver based on the finite element method (FEM). The following expression deduced from equations (1) and (2) governs the relationship between the amplitude, phase difference δ and the elliptical polarization state of the reflected field:

$$\frac{E_x^2}{|E_x^2|} + \frac{E_y^2}{|E_y^2|} - \frac{2\cos\delta}{|E_x||E_y|} E_x E_y = \sin^2\delta \quad (3)$$

The polarization state and phase define the reflectance upon an arbitrary combination of polarizer-analyzer angles; the reflectance is calculated from, $$|E|^2 = \frac{1}{4}\left(\begin{array}{c}(E_x^2 + E_y^2)(1 + \cos 2\phi_a \cos 2\phi_p) + (E_x^2 - E_y^2)(\cos 2\phi_a \cos 2\phi_p) + \\ 2E_x E_y \sin 2\phi_p \sin 2\phi_a \cos(\delta_x - \delta_y)\end{array}\right) \quad (4)$$

Figure 2B:
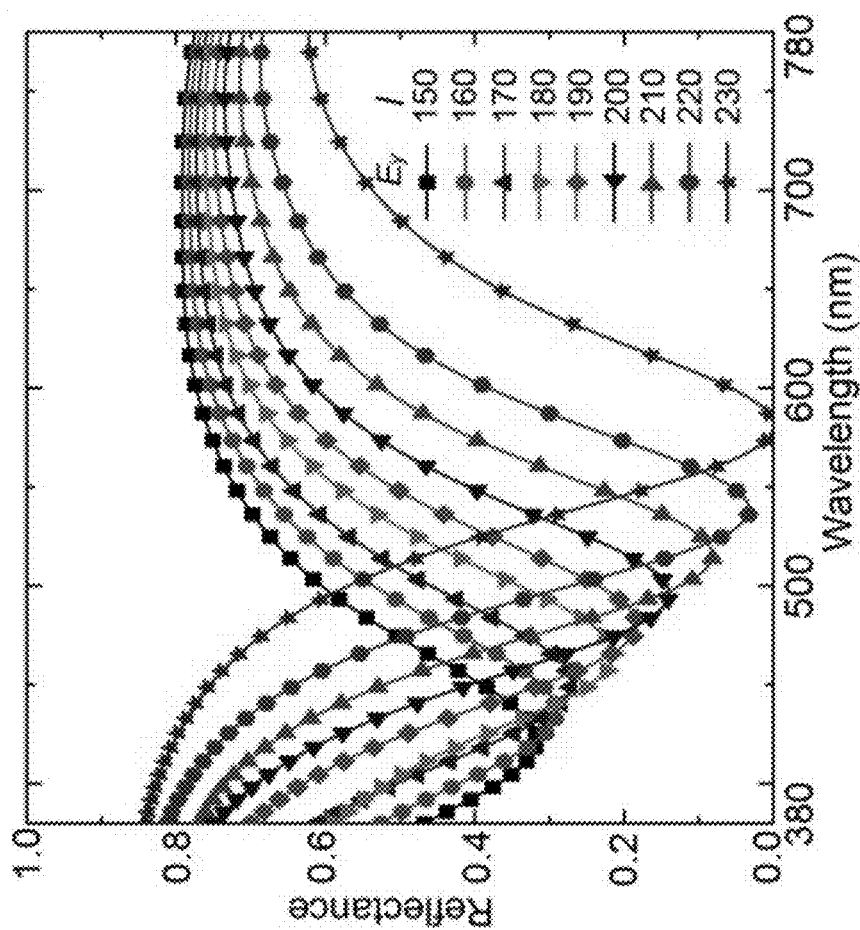
FIG. 2b are calculated reflectance spectra of the anisotropic plasmonic metasurface assembly with the length l of the rectangular-shaped Al nanoantennae of FIG. 1b changing from 150 nm to 230 nm with a step of 10 nm, while its width w is fixed at 80 nm under y polarized incidence.
Figure 2C:
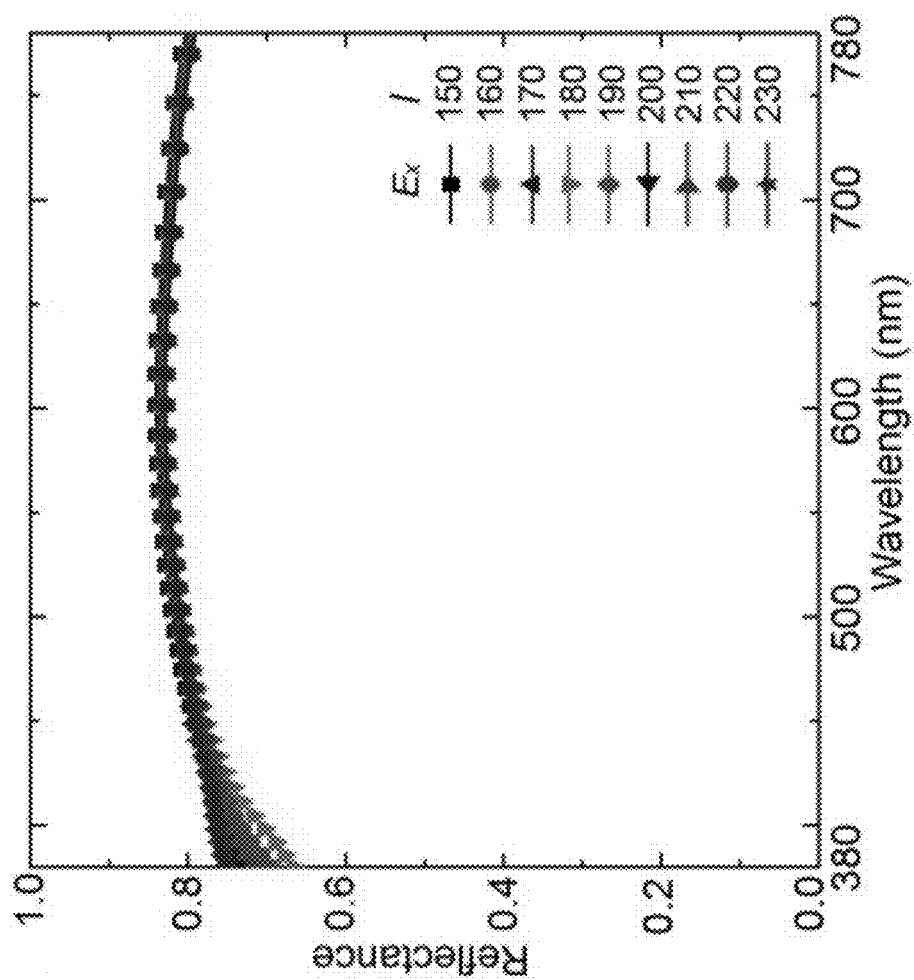
FIG. 2c are reflection spectra of the anisotropic plasmonic metasurface assembly of FIG. 1b when the nanoantenna length l is varied from 150 nm to 230 nm under x polarized incidence.

Referring to FIG. 2b, reflectance spectra of the APM is shown while the length l of the rectangular-shaped Al nanoantennae is changing from 150 nm to 230 nm with a step of 10 nm, while its width w (short axis) is fixed at 80 nm. For the incident polarization along the major axis ($E_y$), the resonant dips of the reflectance spectra redshift (displacement of spectral lines toward longer wavelengths) with the increase of nanoantenna length as shown in FIG. 2b, while for the incident polarization along the minor axis ($E_x$), the reflectance spectra show negligible differences, as shown in FIG. 2c which shows reflectance spectra of the APM again with the length l of the rectangular-shaped Al nanoantennae changing from 150 nm to 230 nm with a step of 10 nm, while its width w (short axis) is fixed at 80 nm.

The length of the nanoantenna along the incident polarization direction determines the spectral position of the LSPR. To determine the length (L) of the nano-antenna for achieving resonance at a certain wavelength ($\lambda_{eff}$), the following relationship can be used:

$$L = \frac{\lambda_{eff}}{2n_{eff}} - 2\delta(\lambda_{eff}) \quad (5)$$

where, δ is the evanescent extension of the resonant antenna mode and determined via fitting as $\delta = \delta_0 - \delta_1 \lambda_{eff} - \delta_2 \lambda_{eff}^2$ ($\delta_0 = 1.2$ μm, $\delta_1 = -3.4$ nm$^{-1}$, $\delta_2 = 0.0024$ nm$^{-2}$). The effective permittivity of the local medium around the antenna is described as $\varepsilon_{eff}(\lambda) = \text{Re}[\varepsilon_{eff}(\lambda)] + i\,\text{Im}[\varepsilon_{eff}(\lambda)] = \frac{1}{2}[\varepsilon_{Al}(\lambda) + \varepsilon_{air}]$. Using the effective permittivity, the effective index can be directly obtained from $$n_{eff}(\lambda) = \sqrt{\frac{1}{2}[|\varepsilon_{eff}(\lambda)| + \text{Re}[\varepsilon_{eff}(\lambda)]]}.$$

Figure 2D:
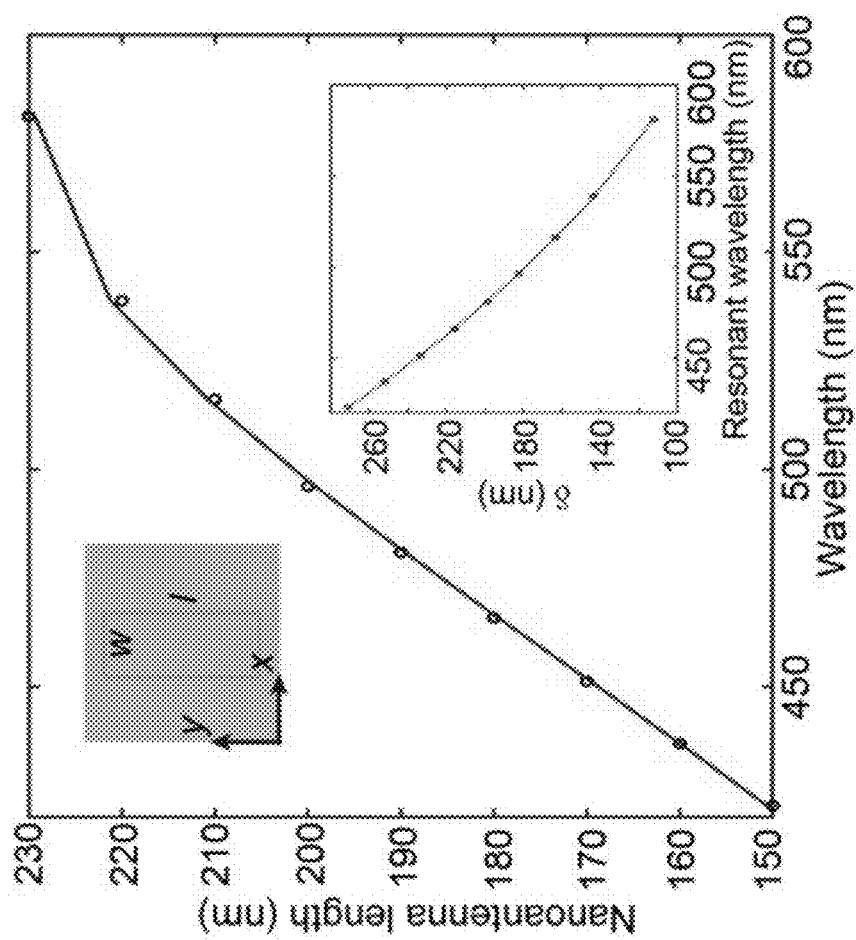
FIG. 2d is graph of calculated positions of reflectance spectral dip versus length of the nanoantenna of FIG. 1b, where the curve shows a fit of the discrete localized surface plasmon resonance positions, and where the upper inset shows the nanoantenna dimensions, and the lower inset shows the $\delta(\lambda_{eff})$ function which expresses evanescent extension of the resonant antenna mode.

Referring to FIG. 2d, the length of the antenna as a function of resonant wavelength is provided with the lower inset showing the $\delta(\lambda_{eff})$ function. The curve in the main panel is a fit of the discrete LSPR positions. The upper inset shows the nanoantenna dimensions, and the lower inset shows the $\delta(\lambda_{eff})$ function.

Figure 2E:
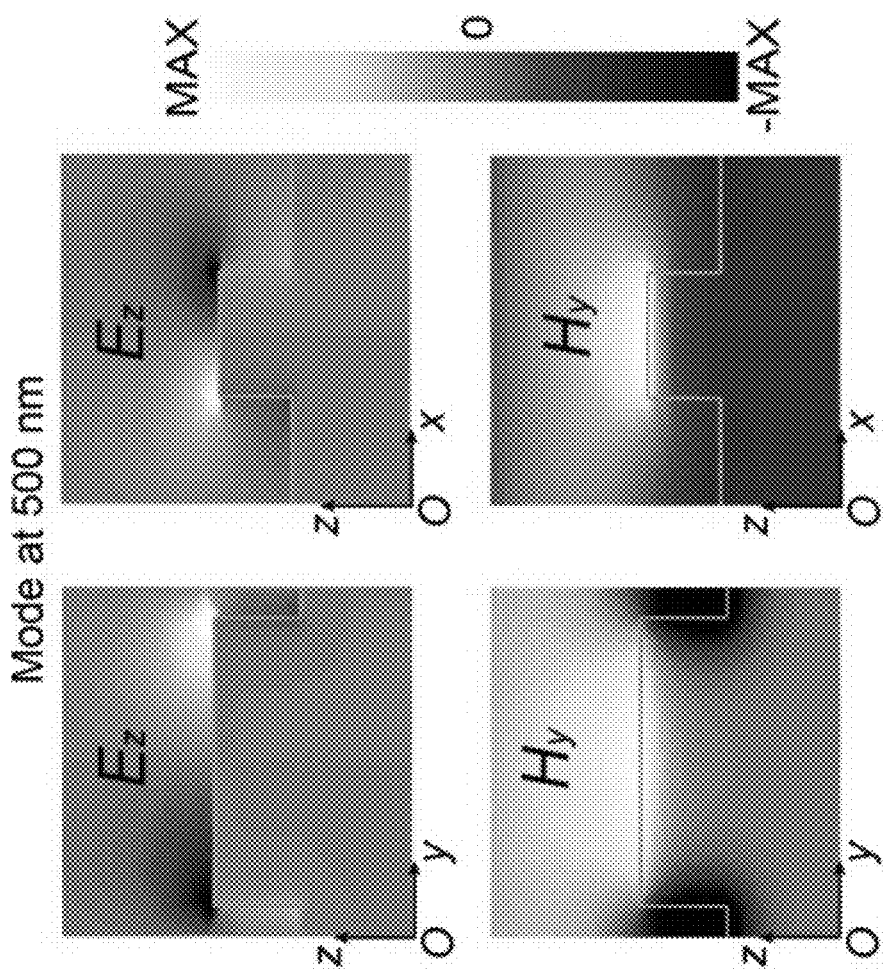
FIG. 2e are the false color maps of electric and magnetic field distributions of the resonant mode at a wavelength of 500 nm.

Referring to FIG. 2e, the on-resonance electric and magnetic field distributions at the vertical cross-section of the nanoantenna with l=200 nm and λ=500 nm are shown, where the fields are highly localized at the corners and edges of the nanoantenna, indicating the excitation of LSPR.

Figure 2F:
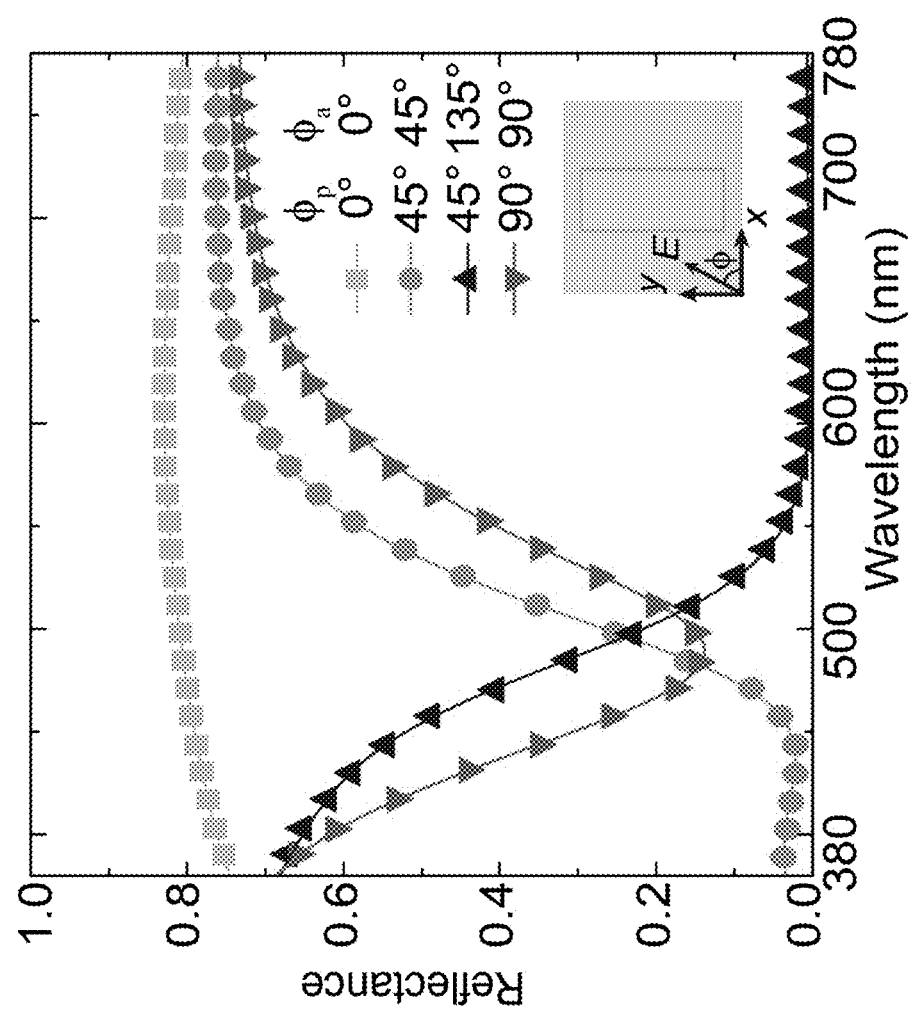
FIG. 2f are graphs of simulated reflectance spectra corresponding to different combinations of angles of linear polarizer-analyzer of FIG. 1a, leading to four distinct colors.

To make APM produce a wide palette of colors, various combinations of angle differences ($\phi_p-\phi_a$) of the linear polarizer 104-analyzer 114 are utilized. The corresponding simulated reflectance spectra at normal incidence are depicted in FIG. 2f. For ($\phi_p=0°$, $\phi_a=0°$ where the p subscript represents the linear polarizer 104 angle and the a subscript represents the analyzer 114 angle), the reflectance spectrum becomes nearly flat across the entire visible spectrum, and the APM reflects a grey color. On the contrary, the spectra for ($\phi_p=45°$, $\phi_a=45°$), ($\phi_p=90°$, $\phi_a=90°$) and ($\phi_p=45°$, $\phi_a=135°$), where each angle is with respect to the x-axis (see FIG. 5d), show distinctive profiles, where the maximum reflectance exceeds 70% while the reflectance at off-resonant wavelengths is highly suppressed. Such a high contrast between the peak and dip values in the reflectance spectra improves color saturation and stability against fabrication uncertainties.

Figure 2G:
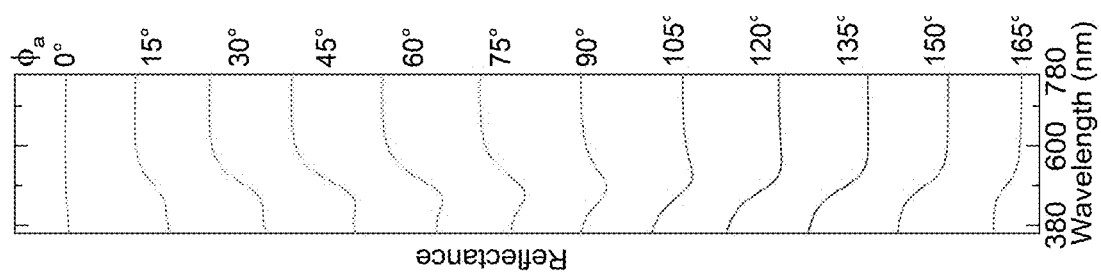
FIG. 2g are simulated spectra of light reflected from the anisotropic plasmonic metasurface assembly when the analyzer of FIG. 1a is rotated from 0° to 165° with a step of 15°, while the linear polarizer is fixed at 45° with respect to the x-axis (see FIG. 5d).
Figure 2H:
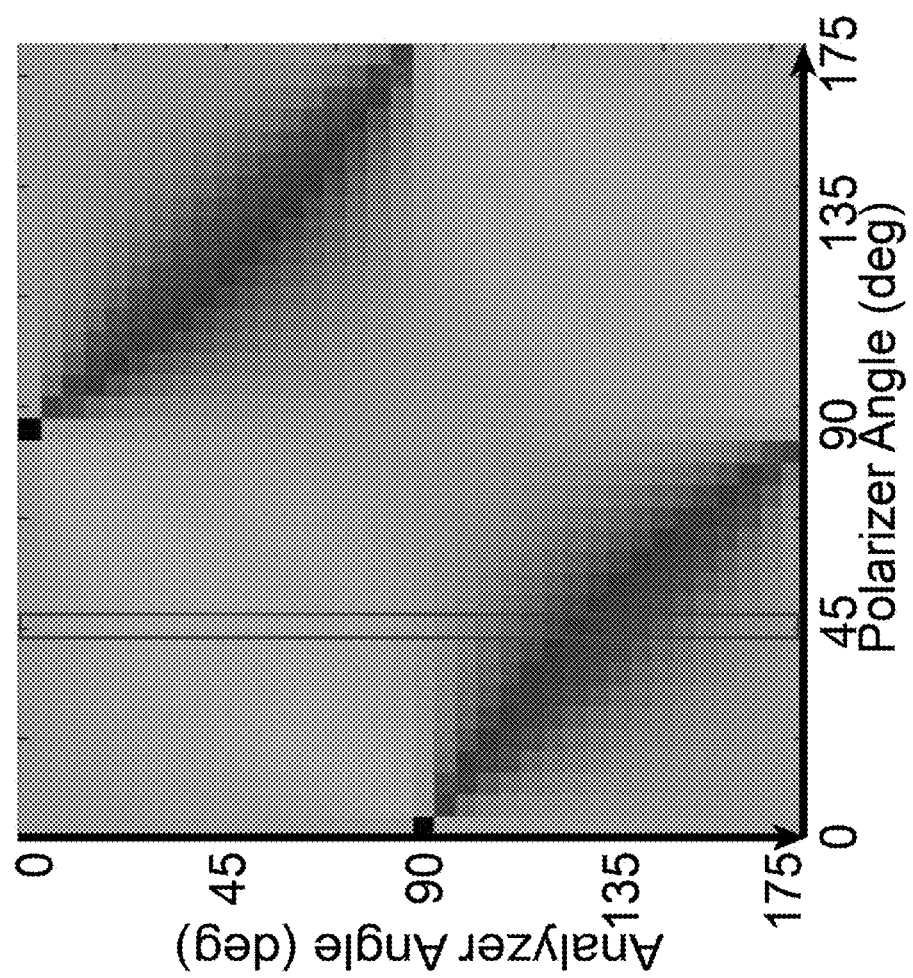
FIGS. 2h and 2i are calculated color palette (FIG. 2h) and corresponding color information on the CIE 1931 chromaticity diagram (FIG. 2i), when both the linear polarizer and analyzer of FIG. 1a are rotated; colors are obtained with simulated reflectance spectra and color-matching functions, where the elliptical color palette shown in FIG. 2i is remapped from the region enclosed by the box in FIG. 2h, with each nanoantenna provided in a vertical orientation.
Figure 2I:
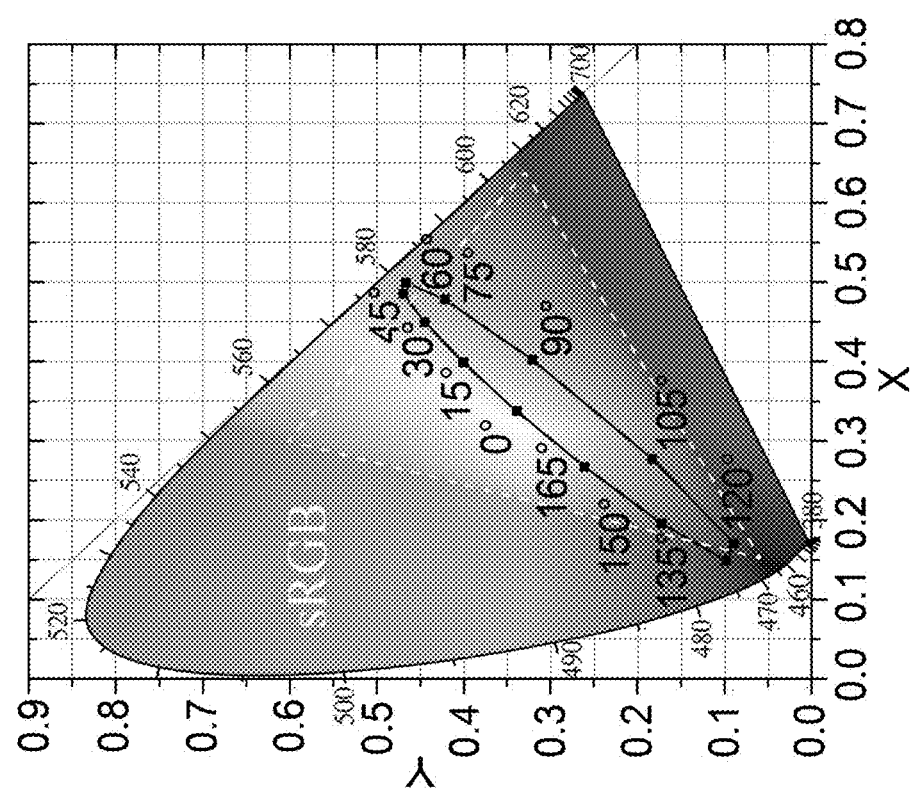

Referring to FIG. 2g, simulated reflectance spectra are shown when the analyzer 114 is rotated from $\phi_a=0°$ to $\phi_a=165°$ with a step of 15° when the angle of the linear polarizer 104 is fixed at 45° where each angle is with respect to the x-axis (see FIG. 5d). The corresponding simulated color palette versus angle combinations of the linear polarizer 104-analyzer 114 is plotted in FIG. 2h. Based on the color matching functions defined by CIE, distribution of the colors in the CIE 1931 diagram can be clearly observed in FIG. 2i, with each nanoantenna provided in a vertical orientation.

While not shown, at least one linear polarizer and at least one analyzer can be rotated (similar to FIG. 2h) with nanoantennae provided in various orientations for even higher diversity of colors. Such higher diversity can provide additional information that can be used with higher sensitivity CCD cameras, to achieve: 1) more bits of information per nanopixel, and 2) additional error-checking.

The anisotropic plasmonic metasurface assembly 150 was fabricated with standard electron-beam lithography (EBL), metallization and lift-off technique. A finite element method (FEM) based commercial software solver (CST Studio Suite 2017) is utilized to calculate the optical response of an elementary structure of the anisotropic plasmonic metasurface assembly 150, with periodic boundary conditions used along x and y directions. The permittivity of Al is obtained from the data measured by a variable-angle spectroscopic ellipsometer (e.g., J. A. Woollam Co., W-VASE). The colors induced by different angular relationships of the linear polarizer 104-analyzer 114 are calculated using the simulated reflectance spectrum and the color-matching functions defined by the International Commission on Illumination (CIE), as known to a person having ordinary skill in the art.

The reflectance spectra are measured using the variable-angle spectroscopic ellipsometer (J. A. Woollam Co., W-VASE) equipped with polarizers. FIG. 2(a) depicts the spectra obtained from a series of twenty measurements; the standard deviation at each point does not exceed the range of $\pm 2.1\times10^{-3}$. The light source is a xenon lamp with a broadband optical spectrum. The incident beam is focused to a spot with a diameter of 500 µm. The beam sequentially passes through a polarizer and then illuminates the sample. The incident angle is 18°. The overall area of the fabricated nanoantenna arrays used to obtain the results in FIG. 2a is 500×500 µm²; each array contains 2000×2000 unit cells The fabrication starts with electron beam evaporation of 100 nm thick aluminum (Al) film with 5 nm titanium (Ti) as an adhesion layer on a float glass (SiO₂) substrate, and spin coating of about 200 nm thick Poly(methyl methacrylate) (PMMA) on the Al film. The geometry of the nanoantennae 152 are then defined on the PMMA by electron-beam lithography (EBL, JEOL JBX-8100FS) and development in a 1:3 methyl isobutyl ketone: isopropanol (MIBK:IPA) solution. Subsequently, 3 nm Ti and 70 nm-thick Al are deposited on the developed PMMA using electron beam evaporation. Finally, liftoff in heated acetone (70° C.) is carried out to define the Al nanoantennae on the optically thick Al film. The above-mentioned fabrication technique is provided as an exemplary fabrication methodology, and no limitation is intended as such. Thus, other fabrication techniques known to a person having ordinary skill in the art are within the scope of the present disclosure for the fabrication of the anisotropic plasmonic metasurface assembly 150.

Figure 3A:
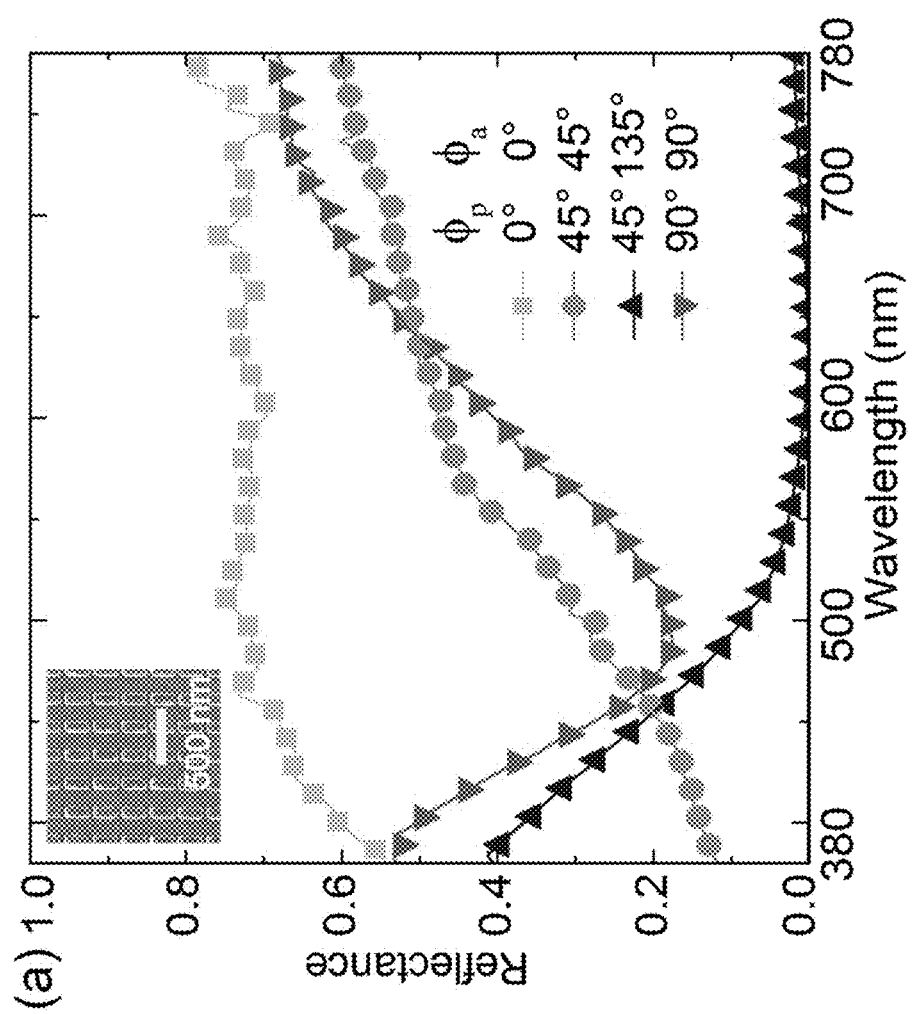
FIG. 3a are graphs of measured reflectance spectra of the anisotropic plasmonic metasurface assembly under four different combinations of angles of the linear polarizer-analyzer of FIG. 1a corresponding to those in FIG. 2f, with the inset being a scanning electron microscope of the Al nanoantennae taken in a random area of the fabricated APM anisotropic plasmonic metasurface assembly of FIG. 1b.
Figure 3B:
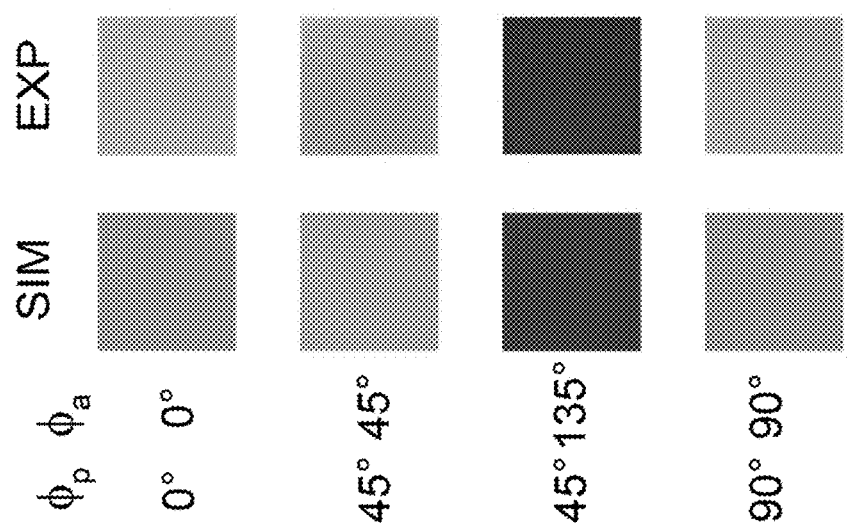

Referring to FIG. 3a, the measured reflectance spectra are shown under the same the linear polarizer 104-analyzer 114 combinations as shown in FIG. 2f. The excellent uniformity and high-fidelity profile of the fabricated nanoantennae lead to a good agreement between measured and simulated spectra. Some differences are due to the shape distortion at the fabricated nanoantenna corners, as well as changes in optical properties of nanostructured Al, which are not accounted for in simulations shown in FIG. 2f. To explore the potential use of this anisotropic plasmonic metasurface assembly 150 as a tunable plasmonic color filter, as discussed with reference to FIG. 1a the colors were photographed with a chromatic charge-coupled device (CCD) camera integrated into an optical microscope. For comparison, we present the simulated and experimentally photographed colors (blue, orange, magenta and grey) in the left and right columns of FIG. 3b, respectively. The comparison shown in FIG. 3b is between the simulated colors (left) and CCD camera photographed colors (right) under the four polarizer-analyzer combinations discussed in FIG. 3a. All photographed images were obtained by collecting the reflected light into the CCD camera with a 20× objective lens (NA=0.45) under white light illumination.

The grey, blue, and magenta colors obtained (photographed) from the experiment agree reasonably well with the simulated ones, while the experimental orange color exhibits some discrepancy from the simulation. The discrepancy can be explained by the orange spectral curve depicted in FIG. 3a—the broader resonance linewidth and relatively flat reflectance profile lead to the reduced color saturation.

Figure 3C:
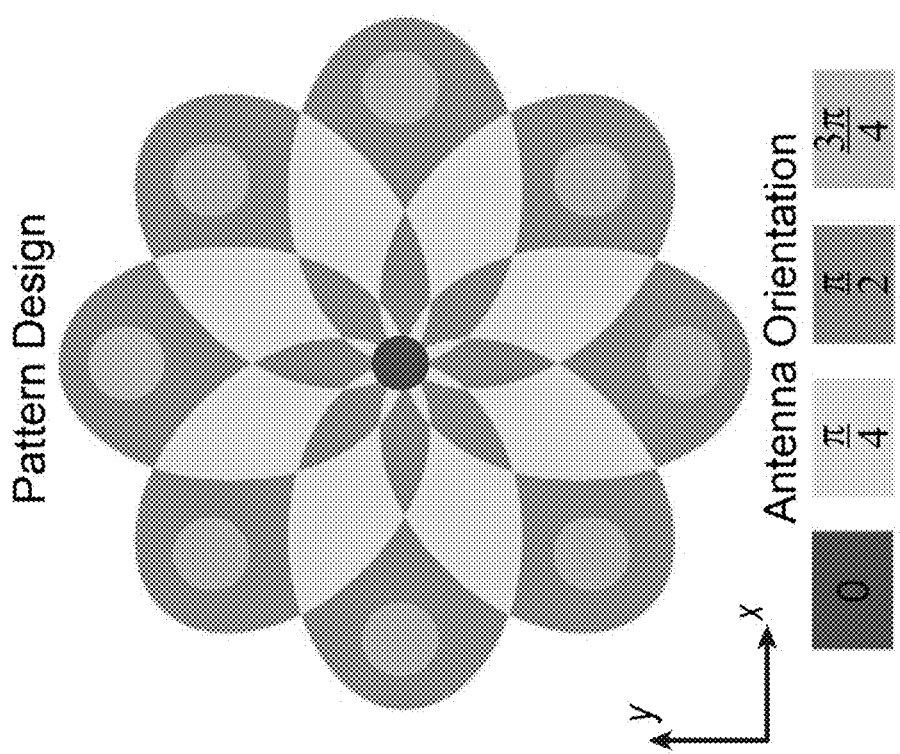
FIG. 3c is a schematic of the steganographic flower pattern presented with different colors indicating different nanoantenna orientations.
Figure 3D:
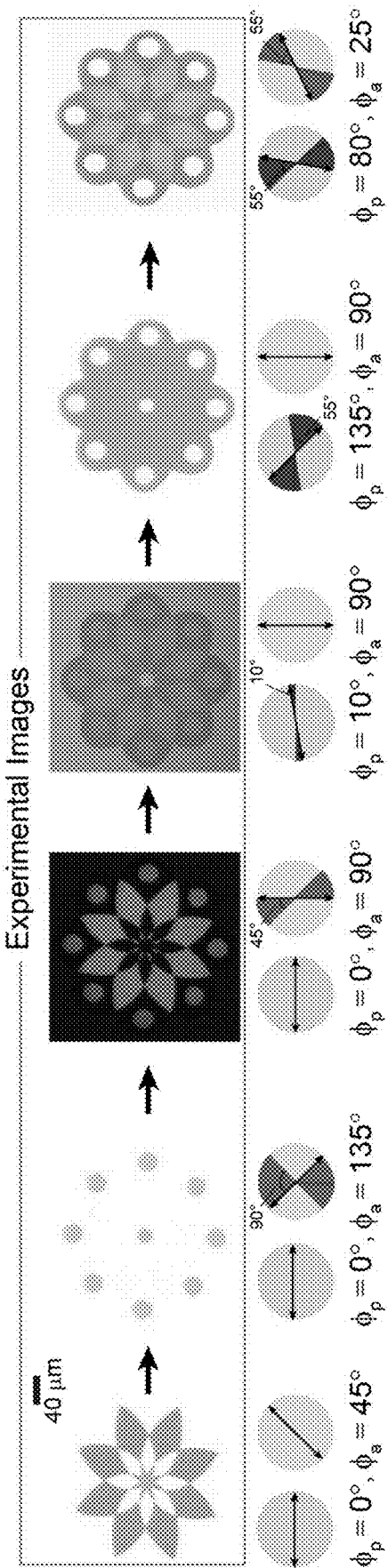
FIG. 3d are experimental optical micrographs upon rotating the polarizer and analyzer of FIG. 1a. The circles below the photographs represent the polarizer (blue) and analyzer (red) angles, with the highlighted regions and corresponding numbers indicating the angles by which the polarizer/analyzer is rotated from the previous state.

The appearance of the color images encoded by the anisotropic plasmonic metasurface assembly 150 of the present disclosure can be readily changed without causing any deformations to the structure. Thus the anisotropic plasmonic metasurface assembly 150 of the present disclosure opens up an avenue for advanced steganography—a technique used to conceal a message or image within another message or image. To demonstrate the concept of steganography with a plasmonic "kaleidoscope", a pattern of an eight-petal flower decorated with a core and eight circular speckles as depicted in FIG. 3c. The areas occupied by differently oriented nanoantennae (0, $$\frac{\pi}{4}, \frac{\pi}{2}, \frac{3\pi}{4},$$

all nanoantenna orientations are with respect to the x-direction henceforth) are labelled by different colors and nanoantenna orientation angles. The square Al nanoantennae (with dimensions of l×w=80 nm×80 nm) are used as the metasurface background, which blends in well with the peripheral part of the flower at specific polarization states. The performance of the plasmonic steganography is presented in FIG. 3d. A magenta flower with eight petals is perfectly observed when the linear polarizer 104-analyzer 114 are set at 0° and 45° with respect to the x-axis (see FIG. 5d), respectively. When the analyzer is rotated by 90° with respect to the x-axis (see FIG. 5d) in the counter-clockwise (CCW) direction, the flower pattern undergoes dynamic profile change with the disappearance of the petals and emergence of "cluster of speckles". This dynamic change occurs because the areas occupied by $$\frac{\pi}{4} \text{ and } \frac{\pi}{2}$$

oriented nanoantennae match the colors generated from the background square-shaped nanoantenna. Simultaneously, the areas occupied by 0 and $$\frac{3\pi}{4}$$

oriented nanoantennae render a clear-cut magenta flower which sharply contrasts with the background. Based on the same principle, more distinct images from this pattern can be revealed under many other angle combinations of the linear polarizer 104-analyzer 114 (see FIG. 3d), largely increasing the information capacity of the steganography technique.

Figure 4A:
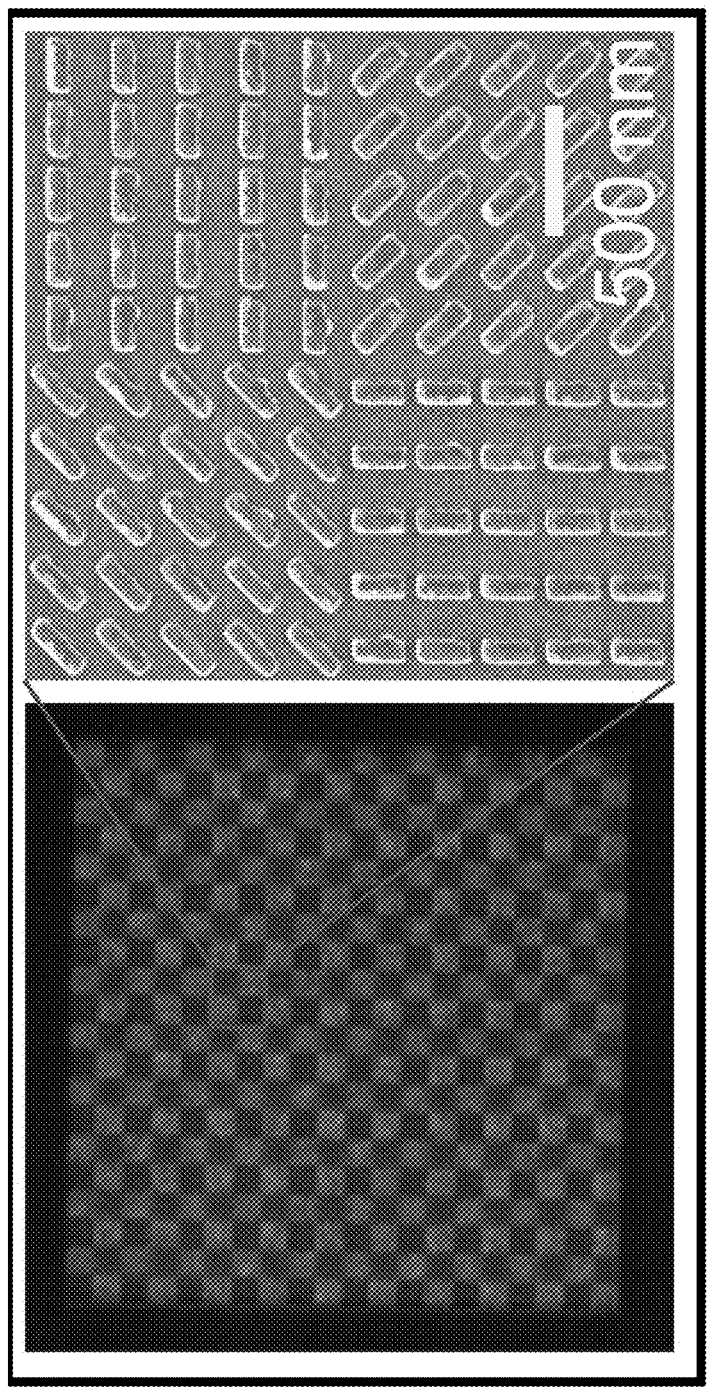
FIGS. 4a, 4b, and 4c are bright-field optical micrographs of checkerboard patterned metasurfaces and the enlarged SEM images in the region of corresponding boxes, where each square box in the checkerboard pattern has a side of 1.25 μm (FIG. 4a), 0.75 μm (FIG. 4b), and 0.5 μm (FIG. 4c) and which include arrays of 5×5 (FIG. 4a), 3×3 (FIG. 4b), and 2×2 (FIG. 4c) nanoantenna unit cells.
Figure 4B:
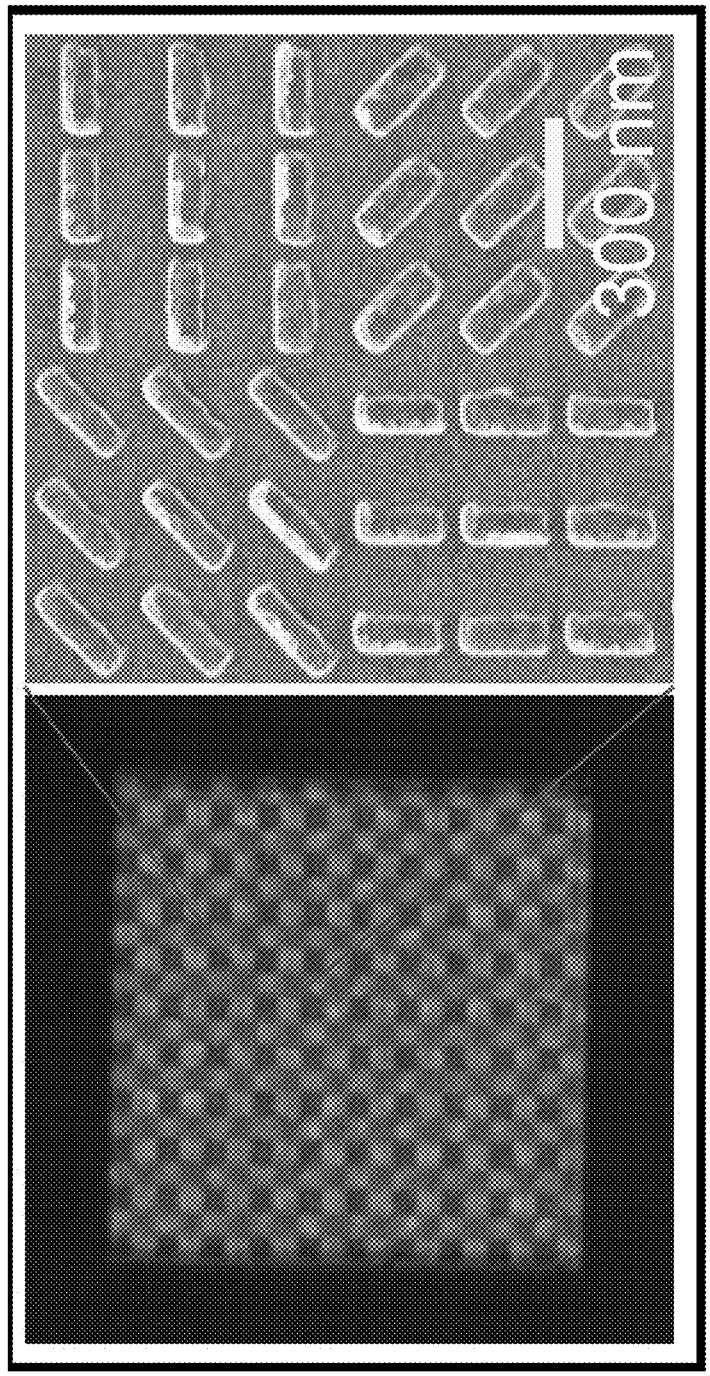
Figure 4C:
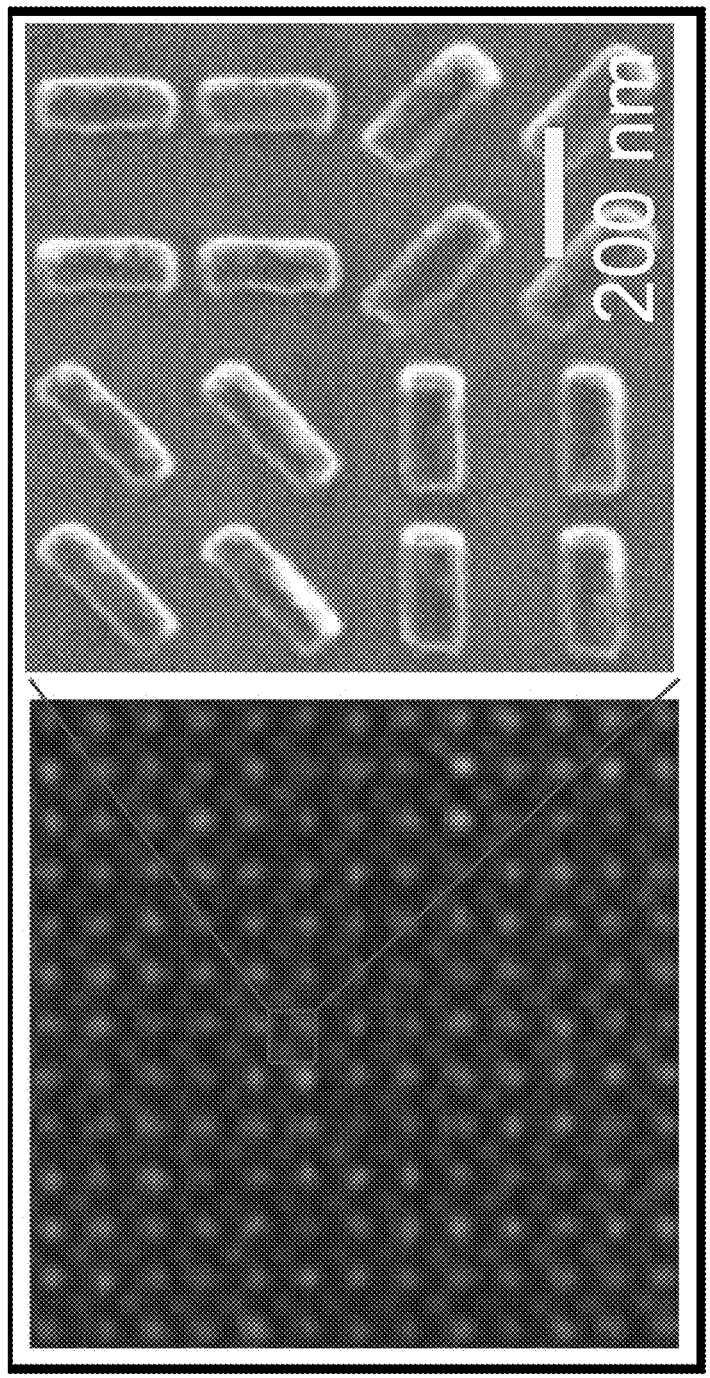
Figure 4D:
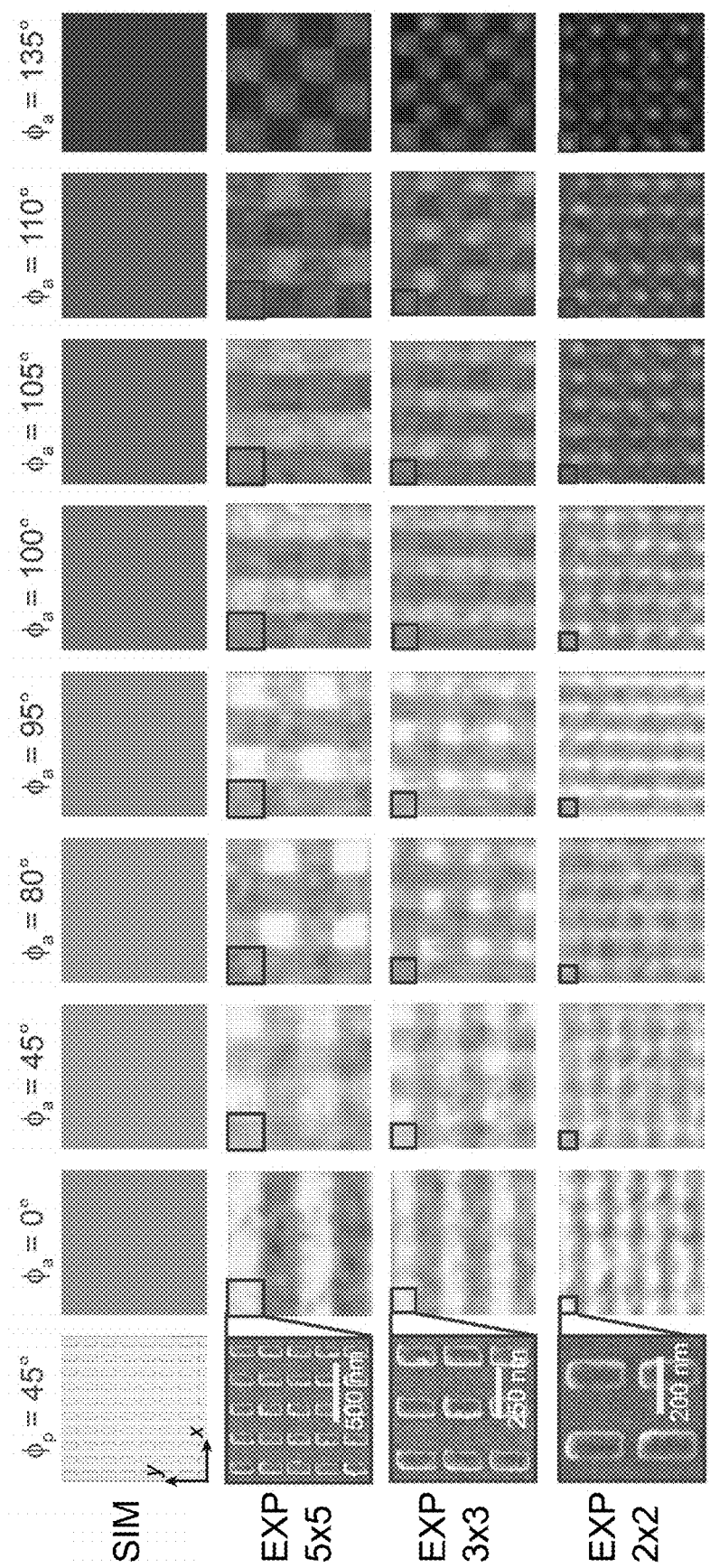
FIG. 4d are simulated colors from infinite nanoantenna arrays (top row), photographed images from 5×5 nanoantennae (second line corresponding to FIG. 4a), 3×3 nanoantennae (third line corresponding to FIG. 4b) and 2×2 nanoantennae (fourth line corresponding to FIG. 4c), where the corresponding analyzer angles are rotated with respect to the x-axis (see FIG. 5d) while the polarizer angle is fixed at 45° with respect to the x-axis (see FIG. 5d).

In addition to the advanced steganography applications discussed herein, expanding the available color palette, tunability and abating the "cross-talk" effect, shrinking the dimensions of distinguishable nanopixels is of great importance for increasing the spatial resolution and information capacity of the anisotropic plasmonic metasurface assembly 150. In order to find out the minimum nanopixel size that can support distinguishable neighboring colors, a checkerboard pattern was fabricated with alternating nanopixels formed by nanoantennae in different orientations as shown in FIGS. 4a-4c. Referring to these figures, bright-field optical micrographs of the checkerboard patterned metasurface and the enlarged SEM images in the region of enlarged boxes are provided. Each square box in the checkerboard has a side of 1.25 µm (FIG. 4a), 0.75 µm (FIG. 4b) and 0.5 µm (FIG. 4c) and includes arrays of 5×5 (FIG. 4a), 3×3 (FIG. 4b), and 2×2 (FIG. 4c) nanoantenna 152 unit cells. In each of FIGS. 4a-4c, two sets of nanoantennae 152, according to the above-schedule are shown. When the linear polarizer 104 is at 0°, and the analyzer is at 90° with respect to the x-direction, the alternating blue-black checkerboard pattern is distinctly observed as depicted in FIGS. 4a and 4b. FIG. 4d shows simulated colors from infinite nanoantenna arrays (line 1), photographed images from 5×5 nanoantennae (line 2), 3×3 nanoantennae (line 3) and 2×2 nanoantennae (line 4). The corresponding angles of the analyzer 114 are marked while the angle of the linear polarizer 104 is fixed at 45° with respect to the x-axis (see FIG. 5d).

Importantly, FIG. 4c shows that nanopixels with only 2×2 nanoantennae can exhibit vibrant alternating black-and-blue dots. The total area of such a nanopixel is 500×500 nm², which is equivalent to a spatial resolution of around 50,000 dots per inch (dpi), better than the recent prior art densities. This effect originates from the LSPR's high field confinement at the nanoantenna/air interface. By rotating the analyzer 114 but fixing the linear polarizer 104 at 45° with respect to the x-direction (see axis 107 in FIG. 5d), more colors reflect from each nanopixel. Interestingly, FIG. 4d shows that eight different colors (see the regions enclosed by the boxes) are observed by photographing the checkerboard pattern with a 100× and 0.9 NA objective. These images agree well with the simulated colors, implying that such an anisotropic plasmonic metasurface assembly 150 of the present disclosure exhibits significant viewing angle tolerance and large data storage potential with 500×500 nm² nanopixels.

To that end, the anisotropic plasmonic metasurface assembly 150 can be used to augment current data storage technology. In conventional data storage devices, a storage unit accommodates only a single bit of information (0 or 1). With the anisotropic plasmonic metasurface assembly 150 of the present disclosure, information is stored in the orientation of the nanoantennae and is attained by one or more analyzers (e.g., the analyzer 114 of FIG. 1a) acquiring color sequences that uniquely match the orientations of the nanoantennae (e.g., the nanoantennae 152 of FIG. 1b). Since a large variety of distinguishable colors can be rendered by rotating the nanoantennae, the amount of information stored in one anisotropic plasmonic metasurface assembly 150 storage unit can greatly surpass a single bit. For example, in the anisotropic plasmonic metasurface assembly 150 of the present disclosure, eight nanoantenna orientations evenly distributed between 0 and $$\frac{7\pi}{8}$$

are utilized to represent eight distinct information states, which can be regarded as three bits of information with each nanoantenna orientation representing 000, 001, 010, 011, 100, 101, 110, or 111. Consequently, the anisotropic plasmonic metasurface assembly 150 of the present disclosure can be programmed by EBL with each nanopixel made up of nanoantenna 152 being the fundamental storage units, each carrying 3-bit information. From the experimental result discussed above, the nanopixels can be as small as 500×500 nm² (2×2 nanoantennae, or unit cells) or even smaller in order to render distinguishable neighboring colors. As such, a nanopixel serves as an indivisible data storage unit, which accommodates 3 bits of information. Thus, the storage density of the anisotropic plasmonic metasurface assembly 150 of the present disclosure (3 bits per 500×500 nm²) is calculated to be 5% larger than that of the state-of-the-art Blu-ray technology (~1 bit per 320×274 nm²). An example of such data-storage based on the anisotropic plasmonic metasurface assembly 150 of the present disclosure is shown in FIG. 5a.

To translate the antenna orientations of the anisotropic plasmonic metasurface assembly 150 of the present disclosure into binary information, a set of color codes that link the nanoantenna-rendered colors with the designated binary states can be used, as well as a parallel-processing data readout system. Referring to FIG. 5b, experimentally-obtained color codes are presented. FIG. 5b shows that a given nanoantenna orientation renders a unique color sequence when sequentially imaged with analyzer (similar to the analyzer 114 shown in FIG. 1a) at angles of 0°, 45°, 90° and 135°, with the linear polarizers (similar to the linear polarizer 104 of FIG. 1a) fixed at 45° with all angles with respect to the x-axis (see FIG. 5d). A 3-bit code is assigned to each nanoantenna orientation state and then retrieved from the corresponding color sequence with an imaging system (similar to that shown in FIG. 5d, which is a schematic of an imaging system according to the present disclosure for reading the encoded bits in the nanoantennae).

To generate the color-code for the data storage, a wheel pattern containing eight nanoantenna orientations was fabricated and the wheel was imaged using four analyzer rotation states (0°, 45°, 90°, 135°) with the polarizer rotation angle fixed at 45° with all angles with respect to the x-axis (see FIG. 5d). The wheel is shown in FIG. 5c. The left panel shows the designed pattern as a wheel including eight equal segments, each occupied by nanoantennae with the orientation marked by the orange-colored numbers. The right panel of FIG. 6 shows photographed images utilizing four analyzer angles with linear polarizer fixed at 45° with respect to the x-axis (see FIG. 5d). The diverse colors from all eight segments under each analyzer angle are then used to construct the color codes in FIG. 5b.

The wheel pattern design and the experimentally obtained images are thus shown in FIG. 5b. Each nanoantenna orientation state renders a different color at a given analyzer rotation angle, thus allowing construction of a color code sequence for each nanoantenna orientation examined with four analyzer states, as shown in FIG. 5b. Assigning an individual 3-bit information state to each 4-color code, a unique correspondence between the nanoantenna orientation state and the 3-bit word can be established. The redundancy in analyzer angles is conducive to more robust data readout and is suitable for more advanced anisotropic plasmonic metasurface assemblies (e.g., a 16-state color map yielding four-bit words) used for data storage systems, discussed further below.

The imaging system shown in FIG. 5d includes four white-light sources and four CCD cameras. All four white-light sources are linearly polarized to 45° with respect to the x-axis (see axis 107 in FIG. 5d) and illuminate adjacent regions of the pre-programmed anisotropic plasmonic metasurface assembly according to the present disclosure. Each illuminated region, hereafter referred to as a frame, may contain multiple nanopixels. For example, the frame shown in FIG. 5a contains 16 nanopixels. CCD cameras record the rendered colors from the frame (each nanopixel in a frame may render a different color) after passing through four respective analyzers at angles mentioned above, and a local cache stores the color information on each nanopixel at each analyzer. Next time, when the array of frames moves forward by the length of one frame, the given frame is imaged at the next analyzer angle. When the frame passes all four CCD cameras, its constituent nanoantenna orientations, thereby stored data, is retrieved by looking up their cache-stored color sequences. The four CCD images in FIG. 5d are associated with the color maps of the single frame shown in FIG. 5a (also highlighted by the dotted box in FIG. 5d), imaged under the four different analyzers.

Consequently, the color sequence on each nanopixel can be obtained to retrieve the binary data stored in the frame, as shown in FIG. 5e. The color-encoding process is further discussed, as follows. A nanopixel with the nanoantenna orientation state of $$\frac{\pi}{8}$$

is first imaged with the analyzer at 0°—the camera records a maroon color, as shown in FIG. 5f. As the sample moves, the sample nanopixel is then sequentially imaged with analyzers at 45°, 90°, and 135° rotation states, so that orange, beige, and blue colors are acquired by the camera, respectively, as shown in FIGS. 5g-5i, where are all angles are with respect to the x-axis (see FIG. 5d). During the entire imaging process, the rotation state of linear polarizer is fixed at 45° with respect to the x-axis (see FIG. 5d). A local cache stores the maroon-orange-beige-blue 4-color sequence from the given nanopixel, and looks it up in the color codes, as discussed with respect to FIG. 5b, to retrieve a binary code of 001 stored in this nanopixel. Several nanopixels in a frame are imaged at once, therefore, the readout speed is significantly increased compared to the conventional single-point readout systems.

The above procedure is applied to all frames of the anisotropic plasmonic metasurface assembly of the present disclosure to read the complete information. The advantage of the proposed readout scheme becomes apparent when the readout speed is considered. It takes 4X steps and a rotating analyzer for a setup with one light source and one camera to complete reading the information in one anisotropic plasmonic metasurface assembly, where X is the number of frames in the anisotropic plasmonic metasurface assembly; whereas only X+3 steps are needed with the proposed parallel-processing setup, which also eliminates the need for a rotating analyzer. It is worth noting that in the proposed readout scheme, the illuminating light need not be focused on one nanopixel, but may instead benefit in operation speed from covering multiple nanopixels, provided that the color on each nanopixel can be spatially resolved by the CCD cameras (in this case, at each analyzer angle the cache stores a map of color pixels each corresponding to a nanopixel, as shown by the CCD images in FIG. 5d). Such large-area readout is superior in readout speed versus a conventional single-unit readout scheme.

The four-analyzer scheme shown in FIG. 5d, provides redundancy for a 3-bit APM. Theoretically, even two analyzer angles are already sufficient to generate color codes that uniquely correspond to a nanoantenna orientation (it can be also observed from FIG. 5b, e.g., 0° and 90° analyzers). However, the redundancy is beneficial here. In particular, the redundancy can be used for error correction, hence enabling more robust information retrieval. Below we demonstrate the use of the four-analyzer scheme with more advanced anisotropic plasmonic metasurface assemblies beyond 3 bits per nanopixel. Indeed, the data storage density in the anisotropic plasmonic metasurface assembly of the present disclosure can be further increased and is ultimately restricted by the CCD spectral resolution. Eight nanoantenna orientations were chosen because the colors generated from these nanoantennae are easily distinguishable by the naked eye. Nonetheless, 4-bit information can be reliably stored in a single nanopixel using 16 different orientation states ranging from 0 to $$\frac{15\pi}{16}.$$

In this case, the storage density increases to 40% higher than a conventional Blu-ray disk. As shown in this example, to increase the storage capacity per nanopixel in the anisotropic plasmonic metasurface assembly of the present disclosure, one needs only to utilize more nanoantenna orientations while keeping the nanoantenna geometry and the nanopixel size unchanged. In contrast to this topology, the topologies of the prior art increase in complexity significantly for additional increment of storage density.

As discussed above, the anisotropic plasmonic metasurface assembly of the present disclosure can be used in data storage applications where the information is stored as the nanoantenna orientation states. This concept is demonstrated first with respect to using eight nanoantenna orientations experimentally—the photographed colors generated from these orientations are easily distinguishable even by the naked eye. However, with a numerical simulation it can be shown that the data storage capacity can be further enhanced by utilizing 16 different nanoantenna orientations, so that each orientation can represent a 4-bit word (a tetrad), thereby doubling the data storage capacity compared to the 8-state (i.e., 3-bit words) discussed above. Referring to FIG. 6, simulated color codes of 16 nanoantenna orientation states are shown which are obtained with the four analyzer rotation states (0°, 45°, 90°, 135°) at a fixed polarizer angle of 45° all angles are with respect to the x-axis (see FIG. 5d). The 16-color sequences uniquely represent the nanoantenna orientation states, therefore can be used to retrieve the corresponding information states. It is to be noted, however, that as the data storage capacity increases, some of the color sequences become indiscernible by the naked eye. Improving the robust read-out may require (i) a higher spectral resolution of the camera, (ii) optimization of the angular states of both antennas and analyzer, (iii) the use of the overdetermined number of the analyzer rotation states; and (iv) utilizing machine learning for spectral recognition.

From another perspective, the checkerboard pattern shown in, e.g., the SEM image of FIG. 4a, can also be used in information encryption applications. In this context, the structure with four alternating nanoantenna orientations is regarded as a ciphertext. As shown in FIG. 7a, when the ciphertext is imaged under 26 different polarizer-analyzer combinations, distinct color patterns can be obtained to represent the entire English alphabet. In order to attain a large variety of color patterns, the polarizer and analyzer angles are no longer limited to integer multiples of 45° but are chosen to optimize the distinguishability between patterns, and are used as keys to decrypt the information. As an example, in FIG. 7b when the ciphertext and two different key sets are sent to two recipients, different color patterns are perceived, from which one reads "YES" whereas the other reads "OUT".

Those having ordinary skill in the art will recognize that numerous modifications can be made to the specific implementations described above. The implementations should not be limited to the particular limitations described. Other implementations may be possible.

The invention claimed is:

1. A plasmonic system, comprising:
   at least one polarizer, configured to provide at least one linearly polarized broadband light beam;
   an anisotropic plasmonic metasurface (APM) assembly having a plurality of nanoantennae (unit cells) each having a predetermined orientation with respect to a global axis representing encoded digital data, the APM assembly configured to receive the at least one linearly polarized broadband light beam and by applying localized surface plasmon resonance, reflect the light with selectable wavelengths associated with the predetermined orientations of the nanoantennae;
   at least one analyzer, configured to receive the reflected light with selectable wavelength, wherein the relative angles between each of the at least one analyzers and each of the at least one polarizers with respect to the global axis are selectable with respect to the orientation of the nanoantennae, thereby allowing decoding of encoded digital data.

2. The plasmonic system of claim 1, wherein each of the plurality of nanoantennae is a rectangle made of one of Al, Ag, Au, TiN, Ti, Mg, Rh, Ga, In, MoN, and a combination thereof.

3. The plasmonic system of claim 2, wherein each of the nanoantennae of the plurality has a width ranging between about 10 nm and about 150 nm, a length ranging between about 150 nm and about 300 nm, a height between about 30 and 150 nm, and a pitch between about 200 nm and about 600 nm.

4. The plasmonic system of claim 1, wherein a nanopixel is defined as including one of 2×2, 3×3, and 4×4 nanoantennae having identical orientation.

5. The plasmonic system of claim 1, wherein each of the plurality of nanoantenna is disposed on an optically reflective substrate, and wherein the substrate is made of one of Al, Ag, Au, TiN, Ti, Mg, Rh, Ga, In, MoN, and a combination thereof.

6. The plasmonic system of claim 5, wherein the plurality of nanoantennae (unit cells) are formed in concentric circles adapted to be analyzed by the at least one analyzer when the substrate is rotating.

7. The plasmonic system of claim 1, wherein the selectable wavelengths range from about 200 nm and 780 nm.

8. The plasmonic system of claim 1, wherein the angle of each of the at least one polarizer is fixed at about 45° with respect to the global axis and where the at least one analyzers is adapted to rotate with respect to the global axis with a resolution of about $\pi/2^{n-1}$, where n is the number of bits of the encoded digital data, and wherein $2 \leq n \leq 16$.

9. The plasmonic system of claim 8, wherein one or more of n bits of the encoded digital data is used for error-detection and correction.

10. The plasmonic system of claim 8, wherein the at least one analyzer represents two analyzers and the at least one polarizer represents two polarizers.

11. A method of storing digital data in a plasmonic system, comprising:
   linearly polarizing at least one broadband light beam by at least one polarizer;
   applying the at least one linearly polarized light beam to an anisotropic plasmonic metasurface (APM) assembly having a plurality of nanoantennae (unit cells) each having a predetermined orientation with respect to a global axis representing encoded digital data, the APM assembly configured to
   receiving the at least one linearly polarized broadband light beam,
   applying localized surface plasmon resonance, and
   reflecting light with selectable wavelengths associated with the predetermined orientations of the nanoantennae;
   adjusting relative angles between at least one analyzer and each of the at least one polarizer with respect to the global axis;
   analyzing the reflected light with selectable wavelength by each of the at least one analyzer; and
   decoding the digital data from the analyzed reflected light.

12. The method of claim 11, wherein each of the plurality of nanoantennae is a rectangle made of one of Al, Ag, Au, TiN, Ti, Mg, Rh, Ga, In, MoN, and a combination thereof.

13. The method of claim 12, wherein each of the nanoantennae of the plurality has a width ranging between about 10 nm and about 150 nm, a length ranging between about 150 nm and about 300 nm, a height between about 30 and 150 nm, and a pitch between about 200 nm and about 600 nm.

14. The method of claim 11, wherein a nanopixel is defined as including one of 2×2, 3×3, and 4×4 nanoantennae having identical orientation.

15. The method of claim 11, wherein each of the plurality of nanoantenna is disposed on an optically reflective substrate, and wherein the substrate is made of one of Al, Ag, Au, TiN, Ti, Mg, Rh, Ga, In, MoN, and a combination thereof.

16. The method of claim 15, wherein the plurality of nanoantennae (unit cells) are formed in concentric circles adapted to be analyzed by the at least one analyzer when the substrate is rotating.

17. The method of claim 11, wherein the selectable wavelengths range from about 200 nm and 780 nm.

18. The method of claim 11, wherein the angle of each of the at least one polarizer is fixed at about 45° with respect to the global axis and where the at least one analyzers is adapted to rotate with respect to the global axis with a resolution with a resolution of about $\pi/2^{n-1}$, where n is the number of bits of the encoded digital data, and wherein $2 \leq n \leq 16$.

19. The method of claim 18, wherein one or more of n bits of the encoded digital data is used for error-detection and correction.

20. The method of claim 18, wherein the at least one analyzer represents two analyzers and the at least one polarizer represents two polarizers.

* * * * *